(12) United States Patent
Aggarwal et al.

(10) Patent No.: US 9,438,419 B1
(45) Date of Patent: Sep. 6, 2016

(54) PROBABILISTIC PASSWORD CRACKING SYSTEM

(71) Applicant: The Florida State University Research Foundation, Inc., Tallahassee, FL (US)

(72) Inventors: Sudhir Aggarwal, Tallahassee, FL (US); Shiva Houshmand, Tallahassee, FL (US); Randy Flood, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 291 days.

(21) Appl. No.: 14/319,775

(22) Filed: Jun. 30, 2014

Related U.S. Application Data

(63) Continuation-in-part of application No. 13/624,249, filed on Sep. 21, 2012, now abandoned, which is a continuation of application No. 13/547,779, filed on Jul. 12, 2012, now abandoned.

(60) Provisional application No. 61/506,785, filed on Jul. 12, 2011.

(51) Int. Cl.
*H04L 9/08* (2006.01)
*G06N 5/04* (2006.01)

(52) U.S. Cl.
CPC ............. *H04L 9/0863* (2013.01); *G06N 5/048* (2013.01); *H04L 2209/26* (2013.01)

(58) Field of Classification Search
None
See application file for complete search history.

(56) References Cited

U.S. PATENT DOCUMENTS 8,539,247 B2 * 9/2013 McGrew ............... G06F 21/46
713/182

8,769,607 B1 * 7/2014 Jerdonek ................. G06F 21/31
726/1
9,178,876 B1 * 11/2015 Johansson ........... H04L 63/0846
2011/0314294 A1 * 12/2011 McGrew ................. G06F 21/46
713/182

FOREIGN PATENT DOCUMENTS

WO    WO 2011162841 A1 * 12/2011

OTHER PUBLICATIONS

Houshmand Yazdi, Analyzing Password Strength & Efficient Password Cracking, 2011, FSU Libraries.*
Houshmand Yazdi, Probabilistic Context-Free Grammar Based Password Cracking: Attack, Defense and Applications, 2015, FSU Libraries.*
Loge. The English Open Word List. Dreamsteep. Date Accessed Sep. 18, 2014. http://dreamsteep.com/projects/the-english-open-word-list.html.

(Continued)

*Primary Examiner* — Saleh Najjar
*Assistant Examiner* — Louis Teng
(74) *Attorney, Agent, or Firm* — Nilay J. Choksi; Smith & Hopen, P.A.

(57) ABSTRACT

System and methodology that utilizes keyboard patterns and alpha string patterns for password cracking. Keyboard patterns can be used as components of passwords, and the relevant shapes can extracted from these keyboard patterns and passwords. This keyboard information can be used to extend a probabilistic context-free grammar that can then be used to generate guesses containing keyboard patterns. Further, patterns in alpha strings, such as repeated words and multi-words, can be systematically learned using a training dictionary. This information can be used to extend the probabilistic context-free grammars which leads to generation of guesses based on the distribution of these patterns in the alpha strings, Keyboard patterns and alpha string patterns, individually and in combination, are shown herein to be effective for password cracking.

20 Claims, 9 Drawing Sheets

(56) References Cited

OTHER PUBLICATIONS

A list of popular password cracking wordlists. 2005. Date Accessed Sep. 2, 2014. http://www.outpost9.com/files/WordLists.html.
Mazurek et al., Measuring Password Guessability for an Entire University. Proceedings of the 2013 ACM SIGSAC conference on Computer & communications security (CCS '13). 2013: 173-186.
De Luca et al., PassShape—stroke based shape passwords. Proceedings of OzCHI. 2007: 1-2.
Narayanan and Shmatikov .Fast Dictionary Attacks on Passwords Using Time-Space Tradeoff. CCS'05. 2005: 1-9.
Vance. If your password is 123456, just make it hackme. New York Times. 2010. Date Accessed Sep. 2, 2014. http://www.nytimes.com/2010/01/21/technology/21password.html.
Bernd Chang. 6 Million User Data of China Software Developer Network (CSDN) Leaked. HUG China. 2011. Date Accessed Sep. 18, 2014. http://www.hugchina.com/china/stories/science/6-million-user-data-of-china-software-developer-network-csdn-leaked-2011-12-22.html.
Castelluccia et al., Adaptive password-strength meters from Markov models. NDSS '12. 2012.
Schweitzer et al., Visualizing keyboard pattern password. 6th International Workshop on Visualization for Cyber Security. 2009: 69-73.
Klein. Foiling the cracker: a survey of and improvements to password security. Proceedings of USENIX UNIX Security Workshop. 1990: 1-11.
Ma et al., A Study of Probabilistic Password Models. Proceedings of the 2014 IEEE Symposium on Security and Privacy (SP '14). 2014: 1-16.
Hashcat advanced password recovery. Last updated Aug. 20, 2014. Date Accessed Sep. 18, 2014. http://hashcat.net/oclhashcat/.
Bonneau. The science of guessing: analyzing an anonymized corpus of 70 million passwords. 2012 IEEE Symposium on Security and Privacy. 2012: 538-552.
Yan et al., Password Memorability and Security: Empirical Results. IEEE Security and Privacy Magazine. 2004. Volume 2: 25-31.
Bonneau and Shutova. Linguistic properties of multi-word passphrases. Proceedings of the 16th international conference on Financial Cryptography and Data Security. 2010: 1-12.
Bensmann. Intelligent Search Strategies on Human Chosen Passwords. Doctoral dissertation, Master's thesis. Technische Universitaet Dortmund. 2009: 1-96.
Kuo et al., Human Selection of Mnemonic Phrase-based Passwords. Symp. On Usable Privacy and Security (SOUPS). 2006: 1-12.
Rabiner. A Tutorial on Hidden Markov Models and Selected Applications in Speech Recognition. Proceedings of the IEEE. 1989. Volume 77 (No. 2 ): 257-286.
Dell'Amico et al., Password strength: an empirical analysis. Proceedings of IEEE INFOCOM 2010. 2010: 1-9.
Hellman et al., A Cryptanalytic Time-Memory Trade-Off. IEEE Transactions on Information Theory. 1980. vol. 6 (Issue 4): 401-406.
Weir et al., Password cracking using probabilistic context-free grammars Proceedings of the 30th IEEE Symposium on Security and Privacy. 2009: 391-405.
Weir et al., Testing metrics for password creation policies by attacking large sets of revealed passwords. Proceedings of the 17th ACM Conference on Computer and Communications Security (CCS '10). Chicago, Illinois. 2010: 162-175.
Shay et al, Can Long Passwords be secure and usable? Proceedings of the SIGCHI Conference on Human Factors in Computing Systems (CHI '14). 2014: 1-10.
Mentens et al., Time-Memory Trade-Off Attack on FPGA Platforms: UNIX Password Cracking. Proceedings of the International Workshop on Reconfigurable Computing: Architectures and Applications. Lecture Notes in Computer Science. 2006. Volume 3985: 323-334.
Kelley et al., Guess again (and again and again): measuring password strength by simulating password-cracking algorithms. Proceedings of the 2012 IEEE Symposium on Security and Privacy. 2012: 523-537.
Oechslin. Making a Faster Cryptanalytic Time-Memory Trade-Off. Proceedings of Advances in Cryptology (CRYPTO 2003). Lecture Notes in Computer Science. Volume 2729: 617-630.
McMillan. Phishing attack targets MySpace users. 2006. Date Accessed Sep. 2, 2014. http://www.infoworld.com/d/security-central/phishing-attack-targets-myspace-users-614.
Shay et al, Encountering stronger password requirements: user attitudes and behaviors. 6th Symposium on Usable Privacy and Security (SOUPS). Redmond, WA. 2010: 1-20.
Houshmand and Aggarwal. Building better passwords using probabilistic techniques. Proceedings of the 28th Annual Computer Security Applications Conference (ACSAC '12). 2012: 109-118.
Musil. Hackers post 450K credentials pilfered from Yahoo. CNET. 2012. Date Accessed Sep. 18, 2014. http://www.cnet.com/news/hackers-post-450k-credentials-pilfered -from-yahoo/.
Riley. Password security: what users know and what they actually do. Usability News. 2006. vol. 8 (No. 1): 1-5.
Stone-Gross et al., Your botnet is my botnet: Analysis of a botnet takeover. Proceedings of the 16th ACM Conference on Computer and Communications Security (CCS '09). Chicago, Illinois. 2009: 635-347.
Schetcher et al., Popularity is everything: a new approach to protecting passwords from statistical-guessing attacks. HotSec'10: Proceedings of the 5th USENIX conference on Hot Topics in Security. 2010: 1-6.
Warren. Thousands of Hotmail Passwords Leaked. 2009. Date Accessed Sep. 2, 2014. http://www.neowin.net/news/main/09/10/05/thousands-of-hotmail-passwords-leaked-online.
The Open wall group,.John the Ripper password cracker. Date Accessed Jul. 30, 2014. http://www.openwall.com/john/.
Zhang et al., The security of modern password expiration: an algorithmic framework and empirical analysis. Proceedings of 17th ACM Conference on Computer and Communication Security (CCS '10). Chicago, Illinois. 2010:176-186.
Wikipedia, "NTLM". Date Accessed Jun. 2, 2013. http://en.wikipedia.org/wiki/NTLM.
TrueCrypt Free Open-Source On-the-fly Encryption. Date Accessed Jun. 2, 2013. http://www.truecrypt.org/.
Manber. A simple scheme to make passwords based on one-way functions much harder to crack. Computers & Security Journal. 1996. vol. 15. (Issue 2): 171-176.
Weir. RE: Test the Strength of Your Password Creation Policy. 2009. Date Accessed Jun. 2, 2013. http://reusablesec.blogspot.com/2009/06/re-test-strength-of-your-password.html.
Weir. Probabilistic Password Cracker—Reusable Security Tools. Date Accessed Jun. 2, 2013. http://sites.google.com/site/reusablesec/Home/password-cracking-tools/probablistic_cracker.
Cain & Able Password Cracker. 2013. Date Accessed Jun. 2, 2013. http://www.oxid.it.
Chomsky. Three models for the description of language. IEEE Transactions on Information Theory. 1956. vol. 2 (No. 3): 113-124.
John the Ripper's cracking modes. Date Accessed Jun. 2, 2013. http://www.openwall.com/john/doc/MODES.shtml.
Naraine. PhpBB Hacked; Details Scarce. ZDNet. Date Accessed Jun. 2, 2013 http://blogs.zdnet.com/security/?p=2493.
Weir and Aggarwal. Cracking 400,000 Passwords or How to Explain to Your Roommate why the Power-Bill is a Little High. Defcon 17. 2009: 1-78.
Password Weir. Reusable Security: Password Cracking, Crypto, and General Security Research. Blog. 2010. Date Accessed Jun. 2, 2013. http://reusablesec.blogspot.com.
Veras et al., On the Semantic Patterns of Passwords and their Security Impact. Network and Distributed System Security Symposium (NDDS '14). 2014: 1-16.
Weir. Using Probabilistic Techniques to aid in Password Cracking Attacks. Dissertation. Florida State University. 2010: 1-140.

\* cited by examiner

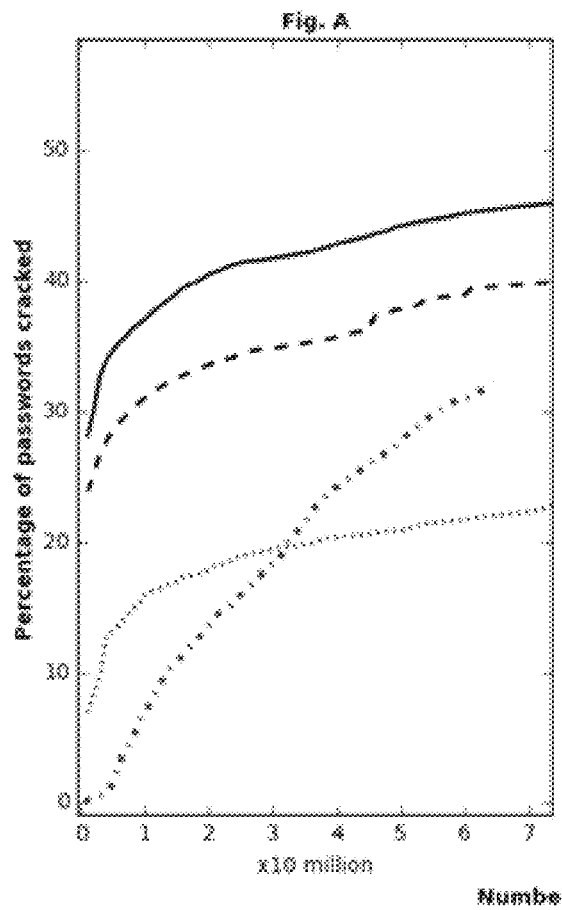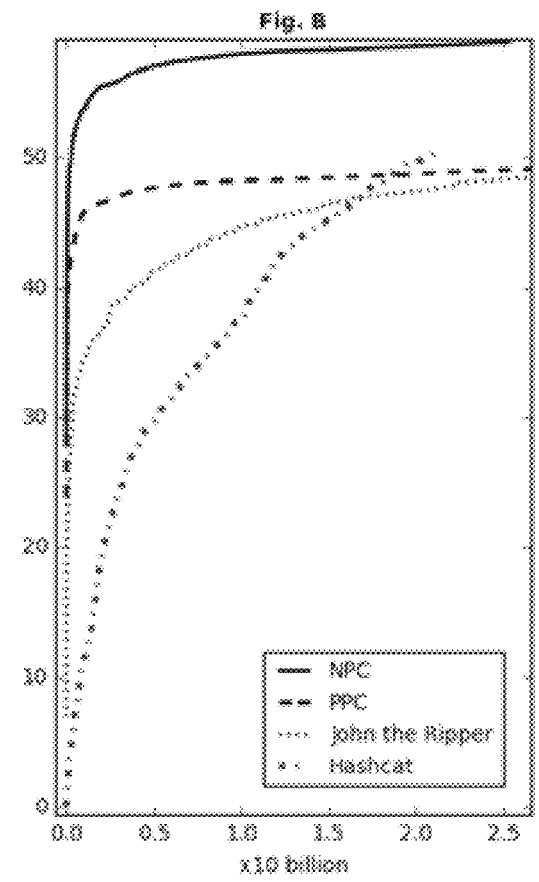
*FIG. 4A*                    *FIG. 4B*

PROBABILISTIC PASSWORD CRACKING SYSTEM

CROSS-REFERENCE TO RELATED APPLICATIONS

This application is a continuation-in-part of and claims priority to U.S. Nonprovisional patent application Ser. No. 13/624,249, entitled "Password Cracking Through Learning Probabilistic CFGs", filed on Sep. 21, 2012, which is a continuation of and claims priority to U.S. Nonprovisional patent application Ser. No. 13/547,779, entitled "Password Cracking Through Learning Probabilistic CFGs", filed on Jul. 12, 2012, which claims priority to U.S. Provisional Application No. 61/506,785, entitled "Password Cracking Through Learning Probabilistic CFGs", filed on Jul. 12, 2011.

FEDERALLY SPONSORED RESEARCH OR DEVELOPMENT

This invention was made with Government support under Grant No. 2006-DN-BX-K007 awarded by the U.S. National Institute of Justice. The government has certain rights in the invention.

BACKGROUND OF THE INVENTION

1. Field of the Invention

This invention relates, generally, to cryptography. More particularly, it relates to a system and method of probabilistic password cracking.

2. Brief Description of the Prior Art

Human memorable passwords provide the basis for much of today's encryption and authentication protocols. This is due to numerous features that passwords possess, such as the lack of additional hardware requirements (e.g., scanners or public/private key tokens), user acceptance, and the ease with which passwords can be transformed into encryption keys via hashing.

In the setting of cracking passwords in a forensic setting, the attacker (e.g., law enforcement) has obtained the password hashes or encrypted files and is now attempting to decrypt the files by figuring out the original passwords from the hashes. A forensic, or offline password cracking attack can be broken up into three distinct steps. First, the attacker makes a guess as to the user's password, for example "password123". Next, the attacker hashes that guess using whatever hashing algorithm was used. In the case of file encryption, the hashing algorithm is used to convert the password guess into an encryption key. Thirdly, the attacker compares the hash of the password guess to the hash the attacker is trying to crack. If the two hashes match, the password is considered broken. With file encryption, the attacker attempts to decrypt the file (or file header) with the key generated, and if the file is decrypted successfully, the password is considered cracked. These three steps are repeated over and over again with new guesses until the attacker breaks the password, or runs out of time. However, this process is very time-consuming (i.e., time that law enforcement might not have) and inefficient in making password guesses.

The two most commonly used methods to make password guesses are brute-force and dictionary based attacks. With brute-force, the attacker attempts to try all possible password combinations. While this attack is guaranteed to recover the password if the attacker manages to brute-force the entire password space, exhaustive search of the password space is often not feasible due to time and equipment constraints. Several techniques have been developed to generate more targeted search spaces, for example Markov models (L. R. Rabiner, "A Tutorial on Hidden Markov Models and Selected Applications in Speech Recognition," *Proceedings of the IEEE*, V. 77, No. 2 (February 1989)), and can be used to generate search spaces according to heuristics about the structure of likely passwords. This strategy has been indeed adopted by popular password crackers such as JOHN THE RIPPER™.

If no salting is used, brute-force attacks can be dramatically improved through the use of pre-computation and powerful time-memory trade-off techniques known as rainbow tables (N. Mentens, L. Batina, B. Preneel, I. Verbauwhede, "Time-Memory Trade-Off Attack on FPGA Platforms: UNIX Password Cracking," *Proceedings of the International Workshop on Reconfigurable Computing: Architectures and Applications*, Lecture Notes in Computer Science, V. 3985, pg. 323-334, Springer (2006); M. Hellman, "A Cryptanalytic Time-Memory Trade-Off," *IEEE Transactions on information Theory*, V. 26, Issue 4, pg. 401-406 (1980); P. Oechslin, "Making a Faster Cryptanalytic Time-Memory Trade-Off," *Proceedings of Advances in Cryptology* (CRYPTO 2003), Lecture Notes in Computer Science, V. 2729, pg. 617-630, Springer (2003)). Some Markov models may be de-randomized into a deterministic index function, allowing them to be combined with time-memory trade-off techniques, such as the construction of optimized rainbow tables (A. Narayanan and V. Shmatikov, "Fast Dictionary Attacks on Passwords Using Time-Space Tradeoff," CCS '05 (Alexandria, Va. Nov. 7-11, 2005)).

The second main technique of making password guesses is a dictionary attack. The dictionary itself may be a collection of word lists that are believed to be common sources from which users choose mnemonic passwords. However, users rarely select unmodified elements from such lists, for instance because password creation policies prevent it, and instead generally modify the words in such a way that they can still recall them easily. In a dictionary attack, the attacker tries to reproduce this approach to password choice by processing words from an input dictionary and systematically producing variants through the application of pre-selected mangling rules. For example, a word-mangling rule that adds the number "9" at the end of a dictionary word would create the guess "password9" from the dictionary word "password."

For a dictionary attack to be successful, it requires the original word to be in the attacker's input dictionary and for the attacker to use the correct word-mangling rule. While dictionary based attack is often faster than brute-force on average, attackers are still limited by the amount of word-mangling rules they can take advantage of due to time constraints. Such constraints become more acute as the sizes of the input dictionaries grow. In this case, it becomes important to select rules that provide a high degree of success while limiting the number of guesses required per dictionary word.

Choosing the right word-mangling rules is crucial as the application of each rule results in a large number of guesses. This is especially true when the rules are used in combination. For example, adding a specific two-digit number to the end of a dictionary word for a dictionary size of 800,000 words would result in 80,000,000 guesses. Creating a rule to allow the first letter to be uppercase or lowercase would double this figure. Furthermore, in a typical password retrieval attempt, it is necessary to try many different mangling rules. Issues arise as to which word-mangling rules should one try and in what order. This is obviously a resource-consuming process.

Attackers, such as law enforcement, are particularly limited by the amount of time and resources that can be devoted to a password cracking session. Even with the introduction of faster hardware implementations for password cracking software, such as GPU's, FPGA's, multi-core computers, and cell processors, the attacker is still limited by the corresponding defensive techniques now being employed. For example, while older password hashing algorithms such as NTLM only required the cracker to compute one round of the MD4 hashing algorithm to make a password guess, new encryption tools such as TRUECRYPT™ can require application of the SHA-512 hashing algorithm one-thousand times using the same guess. In addition, techniques like password salting can render hash pre-computation attacks such as rainbow tables completely ineffective. Thus, it is important for an attacker to make the best guesses possible to maximize the chances of cracking the password given time and equipment constraints.

In addition, there have been many studies that have explored how users choose passwords [S. Riley, "Password security: what users know and what they actually do," Usability News, 8(1); B. Stone-Gross, M. Cova, L. Cavallaro, B. Gilbert, M. Szydlowski, R. Kemmerer, C. Kruegel, and G. Vigna, "Your botnet is my botnet: analysis of a botnet takeover," Proceeding of the 16th ACM Conference on Computer and Communications Security, pp 635-647; R. Shay, S. Komanduri, P. G. Kelley, P. G. Leon, M. L. Mazurek, L. Bauer, N. Christin, and L. F. Cranor, "Encountering stronger password requirements: user attitudes and behaviors," In 6th Symposium on Usable Privacy and Security, July 2010] and recent studies have turned to greater exploration of the strength of passwords [P. G. Kelley, S. Komanduri, M. L. Mazurek, R. Shay, T. Vidas, L. Bauer, N. Christin, L. F. Cranor, and J. Lopez, "Guess again (and again and again): measuring password strength by simulating password-cracking algorithms," Proceedings of the 2012 IEEE Symposium on Security and Privacy, pp 523-537; S. Houshmand and S. Aggarwal, "Building better passwords using probabilistic techniques," Proceedings of the 28th Annual Computer Security Applications Conference (ACSAC '12), December 2012, pp. 109-118; C. Castelluccia, M. Durmuth, D. Perito, "Adaptive password-strength meters from Markov models," NDSS '12; S. Schechter. C. Herley, M. Mitzenmacher, "Popularity is everything: a new approach to protecting passwords from statistical-guessing attacks," HotSec'10: Proceedings of the 5th USENIX conference on Hot Topics in Security]. However, there are not many studies that explore keyboard shapes and how often users choose keyboard combinations or that explore the strength of such keyboard patterns. For example, the focus of De Luca et al. [A. De Luca, R. Weiss, and H. Hussmann, "PassShape—stroke based shape passwords," Proceedings of OzCHI 2007] is mainly on how to define such structures. De Luca et al. use directional line segments (of varying lengths) that they call a stroke and can thus describe a shape on a 10 digit PIN pad.

The work by Schweitzer et al. [D. Schweitzer. J. Boleng, C. Hughes, and L. Murphy, "Visualizing keyboard pattern password," 6th International Workshop on Visualization for Cyber Security, 2009, pp 69-73] focuses on keyboard patterns and describes a way to pictorially describe a shape on the keyboard. Contiguous sequences of key strokes are easy to visualize but they have more difficulty with elements such as repeated strokes. In order to visualize this, they propose that each repeated stroke creates a petal on the same digit illustration. They do describe a small experiment in which they have 161 users create 250 unique patterns. This experiment is performed after the users were given a brief tutorial on how to create patterns. The top 11 shapes that were used for the passwords were then noted. In Schweitzer et al.'s work, they generate a number of keyboard patterns from these shapes and add these to a dictionary (a common way of using keyboard patterns). They then use this dictionary in cracking passwords and compare with John the Ripper. They obtained 11 supposedly strong passwords from their institution and were able to crack 2 of these. However, these keyboard shapes are not integrated into a context-free grammar that is used to create guesses and thus the guesses are incomplete and inefficient.

The work by Bonneau [J. Bonneau, "The science of guessing: analyzing an anonymized corpus of 70 million passwords," In the 2012 IEEE Symposium on Security and Privacy, 2012, pp. 538-552] explores how users create passwords by investigating several revealed password sets, such as RockYou [A. Vance, "If your password is 123456, just make it hackme," New York Times, January 2010] and CSDN [Bernd Chang, "6 Million User Data of China Software Developer Network (CSDN) Leaked", HUG China, Dec. 22, 2011](a Chinese set) and describes how many passwords have various characteristics such as all digits, non-ASCII characters and use of adjacent keys. They use a pattern of adjacent keys excluding repeats as an indication of a keyboard pattern and found that 3% of passwords in RockYou and 11% of CSDN had this pattern. However, this work cannot be directly applied to developing better techniques for probabilistic password cracking.

There has been a great deal of work focused on passphrases including their resistance to cracking and their memorability. For example, Yan et al. [Jeff Yan, Alan Blackwell, Ross Anderson, and Alasdair Grant, "Password Memorability and Security: Empirical Results," IEEE Security and Privacy Magazine, 2(5):25, 2004] conducted an experiment on phrases that are used in deriving mnemonic passwords (using the initial letters of each word in the phrase as the password). They found that such passwords had good security and memorability. As a counterpoint, Kuo et al. [Kuo, C., Romanosky, S., and Cranor, L. F., "Human Selection of Mnemonic Phrase-based Passwords," Symp. on Usable Privacy and Security (SOUPS), 2006] found that users tend to use common phrases and thus the security might not be as high as expected. In more recent work, Bonneau and Shutova [Joseph Bonneau, and Ekaterina Shutova, "Linguistic properties of multi-word passphrases," FC'12, Proceedings of the 16th international conference on Financial Cryptography and Data Security, 2010, PP. 1-12] discuss two word sequences (bigrams) and develop models to indicate which are more likely to represent user behavior in creating these bigrams. They find that users tend to choose natural patterns over other possible patterns such as randomly choosing two words. Furthermore, by trying to guess a corpus of passphrases from AMAZON, they conclude that the security of passphrases is higher than that of passwords. However, this work focuses on passphrases (all words) rather than trying to learn to what extent multi-words are used as components of passwords in order to develop better probabilistic context-free grammars that could create the appropriate guesses incorporating multi-word patterns.

In the literature related to analyzing dictionaries, the dictionaries are sometimes viewed as the guesses themselves. In Bonneau [J. Bonneau, "The science of guessing: analyzing an anonymized corpus of 70 million passwords,"

In the 2012 IEEE Symposium on Security and Privacy, 2012, pp. 538-552], the author creates dictionaries for different groups of YAHOO users based on linguistic background and defines a dictionary as the top one thousand actual passwords from that group. The effectiveness of such dictionaries against other linguistic groups (e.g., Chinese against Italian) is determined. However, this work is really analyzing a set of guesses and not the effectiveness of a dictionary as may be used by a probabilistic password cracking system for generating guesses.

In many other studies, dictionaries are used both as a source of passwords as well as a source for generating variant guesses by applying mangling rules. For example, Klein [D. V. Klein, "Foiling the cracker: a survey of and improvements to password security," Proceedings of USENIX UNIX Security Workshop, 1990] describes some early work in this area. Dell'Amico et al. [M. Dell'Amico, P. Michiardi and Y. Roudier, "Password strength: an empirical analysis," Proceedings of IEEE INFOCOM 2010] can be considered representative of recent work in this area. This study considers several dictionaries available from John the Ripper and an evaluation is done by first comparing the passwords cracked using the dictionary entries only. Two results emerge: (1) it is better to use the same type of dictionary as the target type (for example, Finnish dictionary when attacking Finnish passwords), (2) and although larger dictionaries are better, there are diminishing returns when using these larger dictionaries. The authors next indicate that this also holds true when using dictionaries that are used in conjunction with mangling rules wherein they consider the full space of guesses based on the mangling rules. However, this work does not consider the effectiveness of different dictionaries as the probabilistic password cracking system generates more and more guesses.

All referenced patents and publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

Accordingly, what is needed is a probabilistic password cracking system and method that maximizes the chances of cracking a password using keyboard patterns and multiple dictionaries. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved probabilistic password cracking system and methodology is now met by a new, useful, and nonobvious invention.

It is an object of the current invention to investigate how different dictionaries can be effective as the probabilistic password cracking system generates more and more guesses. Note that dictionaries in password cracking system (PPC) are used only to replace alpha strings in the grammar. When used with the PPC system, a dictionary can typically generate more passwords that could feasibly be tried even in extremely long cracking sessions. Thus, the full set of guesses that a dictionary can produce is only partly relevant to its effectiveness.

In an embodiment, the current invention is a tangible non-transitory computer-readable media having computer-executable instructions for performing a method of running a software program on a computing device, where the computing device operates under an operating system and the method includes issuing instructions from the software program for a computer processor to generate a probabilistic password cracking system for cracking a targeted password for a secured user account. The instructions include receiving known password strings formed of alpha strings, digits, and/or special characters. A base structure is derived from the known password strings, such that one base structure can include more than one password string. A keyboard pattern is automatically incorporated into the base structure, where the keyboard pattern is contained within the password string. The keyboard pattern is a sequence of contiguous characters starting from a particular key without regards to actual characters typed but uses a physical sequence shape of the actual characters. Probability values are automatically assigned to each base structure based on a probability value of each alpha string, digit, special character, and/or keyboard pattern in each base structure. A probabilistic context free grammar is created based on the probability values assigned to each base structure. An input dictionary is received containing a plurality of sequences of alpha characters, and password guess strings are generated from the sequences of alpha characters in decreasing estimated probability order via the probabilistic context-free grammar. A login interface to the secured user account is accessed, and the password guesses are applied sequentially to authenticate the user.

A known password string may include only contiguous digits or only contiguous special symbols, where the known password string is classified as a digit structure or a special symbol structure and not as a keyboard pattern structure. Alternatively, the known password string may include only contiguous alpha characters, where the known password string is classified as an alpha string structure and not as a keyboard pattern structure.

Patterns may be detected in the known password strings, and word-mangling rules may be automatically derived based on the detected patterns. In a further embodiment, the word-mangling rules may be derived further based on the targeted password having an association with a targeted group, where the targeted group would be based on language, age, affiliation, and/or password creation policies.

Probability smoothing may be used to assign additional probability values to other keyboard patterns for other password strings not found in the password strings received. In a further embodiment, probability smoothing can be achieved by an equation $$Prob(p) = Prob(s)\frac{N_i + \alpha}{\sum N_i + C\alpha}$$

where Prob(s) is the probability of a keyboard shape s given the length of the keyboard pattern, Ni is the number of times an ith keyboard pattern of a shape s was found, α is a smoothing value, $\Sigma N_i$ is a sum of counts of the keyboard patterns found for the shape s, and C is a total number of unique patterns for the shape s.

Relevant patterns may be detected from the known password strings, wherein the relevant patterns are an A-word, an R-word, an R-pattern, an M-word, or an A-pattern. The relevant patterns would be incorporated into the probabilistic context-free grammar.

A primary dictionary of the received input dictionaries can be optimized based on size and content of the primary dictionary. A probability value would be assigned to that primary dictionary as well. Effectiveness of the primary dictionary would be measured by coverage and precision of the primary dictionary cracking the targeted password. In a further embodiment, the input dictionaries can include a secondary dictionary.

In a separate embodiment, the current invention is a tangible non-transitory computer-readable media having computer-executable instructions for performing a method of running a software program on a computing device, where the computing device operates under an operating system and the method includes issuing instructions from the software program for a computer processor to generate a probabilistic password cracking system for cracking a targeted password for a secured user account. The instructions include receiving known password strings formed of alpha strings, digits, and/or special characters. A base structure is derived from the known password strings, such that one base structure can include more than one password string. Relevant patterns are detected from the known password strings, wherein the relevant patterns are an A-word, an R-word, an R-pattern, an M-word, or an A-pattern. Probability values are automatically assigned to the relevant patters and to each base structure based on a probability value of each alpha string, digit, and special character in the base structure. A probabilistic context-free grammar is created based on the probability values assigned to the relevant patterns and to the base structure. An input dictionary is received containing a plurality of sequences of alpha characters, and password guess strings are generated from the sequences of alpha characters in decreasing estimated probability order via the probabilistic context-free grammar. A login interface to the secured user account is accessed, and the password guesses are applied sequentially to authenticate the user.

Optionally, a keyboard pattern may be automatically incorporated into the base structures, where the keyboard pattern is contained within the password string. The keyboard pattern is a sequence of contiguous characters starting from a particular key without regards to actual characters typed but uses a physical sequence shape of the actual characters. Probability values assigned to each base structure would be based also on the keyboard pattern in each base structure. In a further embodiment, probability smoothing may be used to assign additional probability values to other keyboard patterns for other password strings not found in the password strings received. In another embodiment, when a known password string includes only contiguous alpha characters, only contiguous digits, or only contiguous special symbols, the known password string would be classified as an alpha string structure, a digit structure, or a special symbol structure, respectively, and not as a keyboard pattern structure The probabilistic context-free grammar may further include deriving substructures from the alpha strings.

A relevant pattern may be classified as an A-word by checking the presence of each alpha string in the known password strings. A relevant pattern may be classified as an R-word or R-pattern by checking a repetition of each alpha string in the known password strings, followed by checking the presence of the pattern of each alpha string in the known password strings. A relevant pattern can be classified as an M-word if the relevant pattern is not classified as an A-word, R-word, or R-pattern. A relevant pattern can be classified as an A-pattern if it is not classified as an M-word. In a further embodiment, the M-word classification can be done by detecting a lengthy substring that is a word in the known password strings. The lengthy substring can be identified as a first component by starting at a rightmost character of the substring and recursively calling a repetitive alpha string along the remaining substring.

A primary dictionary of the received input dictionaries can be optimized based on size and content of the primary dictionary. A probability value would be assigned to that primary dictionary as well. Effectiveness of the primary dictionary would be measured by coverage and precision of the primary dictionary cracking the targeted password. In a further embodiment, the input dictionaries can include a secondary dictionary.

In a separate embodiment, the current invention can include any one or more, or even all, of the foregoing limitations in a single embodiment.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which:

FIG. 4A is a graphical illustration comparing password crackers using Combined-set, where Hashcat is used with the Best64 rule set.

FIG. 4B is a graphical illustration comparing password crackers using Combined-set, where Hashcat is used with the Deadone rule set.

DETAILED DESCRIPTION OF THE PREFERRED EMBODIMENT

Figure 1:
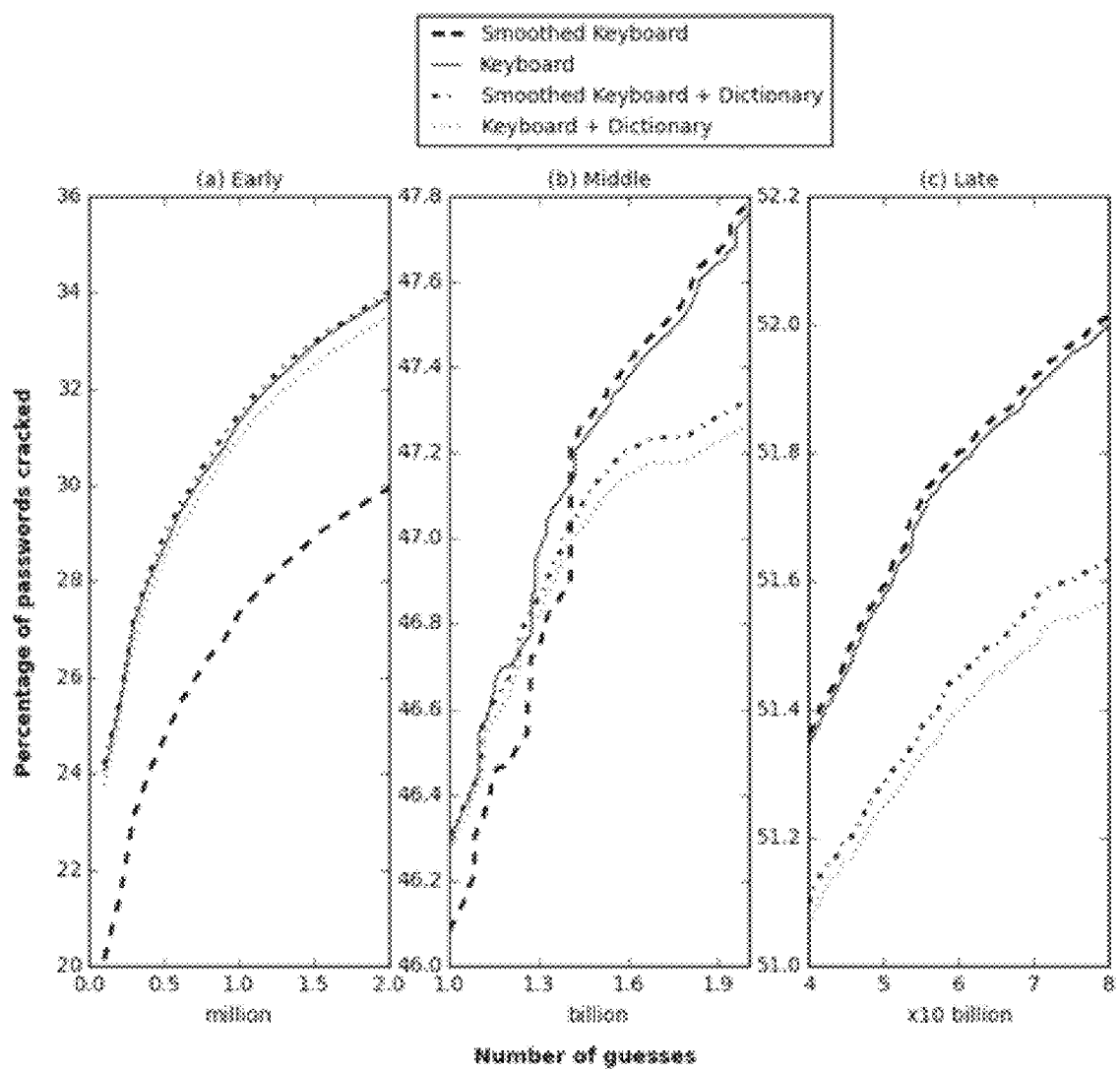
FIG. 1A is a graphical illustration depicting results for keyboard versions using Combined-set for Early (up to 20 million).
FIG. 1B is a graphical illustration depicting results for keyboard versions using Combined-set for Middle (1-2 billion).
FIG. 1C is a graphical illustration depicting results for keyboard versions using Combined-set for Late (40-85 billion).

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

Passwords remain a key to authentication security despite newer proposed authentication techniques, such as biometric-based techniques and dual factor authentication. The primary reason is the ease of use and the ability of humans to remember reasonably-sized passwords. Because of their fairly universal use, it is often necessary for law enforcement to be able to crack passwords and thus it has been important to make progress in cracking techniques. For example, in forensic settings in an offline attack, law enforcement has the hashes of a set of passwords and needs to make guesses until a sufficient number of the hashes are identified. In another example, password cracking is often used in corporations to crack the passwords of machines for which the password has been forgotten or for which the password is no longer available because an employee has left.

As discussed, password cracking approaches can broadly be categorized into those that use dictionaries and those that use brute force. In the brute force approach, a systematic generation of all possible passwords is attempted. Because the search space goes up exponentially with length, Markov chain based approaches [The Open wall group, John the Ripper password cracker; A. Narayanan and V. Shmatikov, "Fast dictionary attacks on passwords using time-space tradeoff," CCS'05. November 2005] are often used in conjunction with brute force attacks to derive character patterns based on their n-gram distributions.

In dictionary based attacks, dictionaries have been used in two ways: (1) they have sometimes been used directly as the guesses that are to be made and (2) they have more generally been used to create guesses by using the entries and then mangling (modifying) these entries in some systematic way. The latter is what is done in the popular password cracking system, John the Ripper. In the probabilistic based approach of Weir et al. [M. Weir, S. Aggarwal, B. de Medeiros, and B. Glodek, "Password cracking using probabilistic context-free grammars," Proceedings of the 30th IEEE Symposium on Security and Privacy, May 2009, pp 391-405], the approach is different since the password guesses are generated in highest probability order using a grammar derived from training on revealed sets. The dictionary is used in a specialized way, and the mangling rules are implicit. In certain embodiments, the current invention focuses on this dictionary based approach.

An advance in password cracking was the probabilistic approach of Weir et al. [M. Weir, S. Aggarwal, B. de Medeiros, and B. Glodek, "Password cracking using probabilistic context-free grammars." Proceedings of the 30th IEEE Symposium on Security and Privacy, May 2009, pp 391-405], in which a training set of revealed passwords was used to define a probabilistic context-free grammar (PCFG). This grammar in turn is used to generate guesses. The guesses are generated with the help of an attack dictionary that supports replacing the words in the dictionary into the password components that are sequences of alphabetic characters which are termed alpha strings. This probabilistic password cracking (PPC) system/approach has been shown to be useful for password cracking and has been used by many authors [M. Dell'Amico, P. Michiardi and Y. Roudier, "Password strength: an empirical analysis," Proceedings of IEEE INFOCOM 2010; P. G. Kelley, S. Komanduri, M. L. Mazurek, R. Shay, T. Vidas, L. Bauer, N. Christin, L. F. Cranor, and J. Lopez, "Guess again (and again and again): measuring password strength by simulating password-cracking algorithms," Proceedings of the 2012 IEEE Symposium on Security and Privacy, pp 523-537; Y. Zhang, F. Monrose, and M. K. Reiter, "The security of modern password expiration: an algorithmic framework and empirical analysis," Proceedings of ACM CCS '10, 2010; M. Weir, S. Aggarwal, M. Collins, and H. Stern, "Testing metrics for password creation policies by attacking large sets of revealed passwords," Proceedings of CCS '10. Oct. 4-8, 2010, pp. 163-175; S. Houshmand and S. Aggarwal, "Building better passwords using probabilistic techniques," Proceedings of the 28th Annual Computer Security Applications Conference (ACSAC '12), December 2012, pp. 109-118].

The original PPC system uses simplistic components to represent a password, as discussed in U.S. Nonprovisional patent application Ser. No. 13/624,249. In certain embodiments, the current invention is an improved probabilistic password cracking system that incorporates keyboard patterns and patterns in alpha strings (such as multi-words and repeated words) into the context-free grammar. The system illustrates how classes of new patterns can be discovered in the training set and can be used systematically to continue cracking in highest probability order. As will become clearer as this specification continues, the problem of ambiguity in the grammar, which naturally arises when adding these new patterns, can be overcome by certain embodiments of the current invention. The system can also develop better dictionaries for probabilistic password cracking. In dictionary-based attacks, the specific mangling rules, as well as the attack dictionary, can be very important. Various types of dictionaries, both during the training and attack phase for more effective cracking, can be evaluated for effectiveness.

Keyboard patterns are physical patterns on the keyboard that are remembered because of their shape. It has always been assumed anecdotally that keyboard patterns are likely to result in strong passwords because they create seemingly random strings but can nevertheless be easily remembered. In fact, this belief led to proposed approaches, where the password entry itself is supported by an input system that can directly recognize or derive the shapes thorough a combination of touch screen techniques and recognition of a user's eye movements. These systems, however, have been only seriously proposed for PIN code patterns where the number and variety of patterns is quite limited.

Generally, certain embodiments of the current invention involve techniques that utilize keyboard patterns as components of passwords and extract the relevant shapes from these keyboard patterns and passwords. This keyboard information can be used to extend a probabilistic context-free grammar that can then be used to generate guesses containing keyboard patterns. Using smoothing techniques, other keyboard patterns that were not in the training data can also be systematically generated. In testing, as will be described further, the effectiveness of using keyboard patterns and smoothing has been shown. Further, training dictionaries can be used, where the training dictionaries can filter out words that also happen to be keyboard patterns (such as "tree" in the password "tree2013"). Although the use of a training dictionary turns out to be very useful for identifying patterns in alpha strings, this filtering may not be of significant help in password cracking when identifying keyboard patterns.

Alpha strings are often essential components of a password and in dictionary attacks they often form the base component that is mangled. Multi-words (or passphrases) have been widely proposed as a way to build stronger and more memorable passwords. They are also often used when longer passwords are required because they are more resistant to brute force attacks. Using embodiments of the current invention, patterns in alpha strings, such as repeated words and multi-words, can be systematically learned using a training dictionary. This information can be used to extend the probabilistic context-free grammars which leads to generation of guesses based on the distribution of these patterns in the alpha strings.

In the testing described herein, both keyboard patterns and alpha string patterns, individually and in combination, are very effective for password cracking, and the current PPC shows consistent improvement over previous PPCs. In particular tests that will be described herein, improvement ranged from 15% to 22% for password cracking effectiveness. The current PPC was also compared with other password crackers. For example, in another test, improvement over John the Ripper [The Open wall group. John the Ripper password cracker] ranged from 13% to 305%. These results were over a cracking curve of guesses up to 85 billion.

Attack dictionaries were also analyzed, created and used more effectively. Particular measures/criteria were developed using precision and coverage to compare dictionaries with respect to target sets. Secondary dictionaries were also used in the probabilistic password cracking to give more weight to some words over others. Attack dictionaries in previous PPCs were used only to replace an alphabet component when generating a password guess. Further, in the literature, some of the studies analyzing dictionaries from the perspective of effectiveness of the guesses typically considered a dictionary to be the actual guesses. With the current PPC, however, it is shown how different dictionaries can be better used from the perspective of their capability to generate useful guesses in highest probability order. In a series of tests, it was seen that by increasing coverage of a dictionary using particular analysis techniques, the cracking improved by another 33%.

Generally, the current specification presents the first systematic study of classes of keyboard and alpha string patterns including their prevalence and use in probabilistic password cracking. Measures were then developed to gauge effectiveness and show how to improve attack dictionaries, both primary and secondary, for probabilistic password cracking. The current PPC system was then built and incorporates these new classes of patterns into the grammar and creates the improved dictionaries. This current PPC system was seen, via extensive testing, to be substantially improved over previous or conventional password cracking systems, such as that of Weir et al. [M. Weir, S. Aggarwal, B. de Medeiros, and B. Glodek, "Password cracking using probabilistic context-free grammars," Proceedings of the 30th IEEE Symposium on Security and Privacy, May 2009, pp 391-405].

As background for probabilistic password cracking, Weir et al. describes a probabilistic context-free grammar derived from training on large sets of revealed passwords. This grammar was then used to generate guesses based on the various probabilities found in the training data. Guesses were generated by PPC in highest probability order, which is the optimal off-line attack if no other information were known. Password string components including alphabet symbols (alpha strings) were denoted as L, digits as D, special characters as S, and capitalization as C. A number was also associated with the component to show the length of the substring. Such strings were called the base structures. There were two major phases in this password cracking approach of Weir et al.:

(1) Training: This phase generated the context-free grammar from a training set of disclosed real user passwords. The observed base structures and their frequencies were derived from the training set of passwords. Probability information for digits, special characters and capitalization were also obtained. This information was used to generate the probabilistic context-free grammar. The probability of any string derived from the start symbol was then the product of the probabilities of the productions used in its derivation. See Table I.

TABLE 1

EXAMPLE PROBABILISTIC CFG

| Left Hand Side | RIGHT HAND SIDE | Probability |
| --- | --- | --- |
| S→ | $D_3L_3S_1$ | 0.8 |
| S→ | $S_2L_3$ | 0.2 |
| $D_3$→ | 123 | 0.76 |
| $D_3$→ | 987 | 0.24 |
| $S_1$→ | ! | 0.52 |
| $S_1$→ | # | 0.48 |
| $S_2$→ | ** | 0.62 |
| $S_2$→ | !@ | 0.21 |
| $S_2$→ | !! | 0.17 |
| $L_3$→ | dog | 0.5 |
| $L_3$→ | cat | 0.5 |

With this grammar, for example, the password "987dog!" could be derived with a probability 0.05. The learning phase did not actually include determining probabilities of the alpha strings since these were not considered to be a sufficient sample even for large training sets. Instead, for example, the $L_3$ part of the guess came from a dictionary with probability equal to one over the number of words of that length. Furthermore, probability smoothing could be used to give an appropriately low probability value to digits, special symbols, and base structures that did not appear in the training set.

(2) Generating Guesses: The guess generation phase generates the possible password guesses in decreasing probability order using the context-free grammar obtained from the training step. Multiple dictionaries could be used with probabilities associated with each.

However, by using the current PPC system, as opposed to the original PPC system of Weir et al. just described, and taking advantage of keyboard and multiword patterns as well as the improved dictionaries, the average improvement over previous PPC systems over a cracking session of 85 billion guesses was 55%, with 76% of the target set being cracked.

This 55% improvement over a target set can be translated into how effective the current PPC system can be when attempting to crack a single password. For example, if law enforcement wants to make enough guesses to have a 50% chance of cracking a specific password, which can be translated as the time it takes to crack 50% of the passwords of a target set, if it can be assumed $3\times10^7$ guesses can be evaluated per minute, the original PPC system of Weir et al. would take about 47 hours, whereas the current PPC system would take about two (2) minutes.

Adding Keyboard Patterns & Multiword Patterns to the Context-Free Grammar

The current PPC system substantially improves upon the conventional art, in part, by systematically adding keyboard patterns and multiword patterns (two or more words in the alphabetic part of a password) to the context-free grammars used in the probabilistic password cracking. The results on cracking multiple data sets show that by learning these new classes of patterns, an improvement of up to 22% can be achieved over the original system.

Keyboard patterns can be found in the training data and incorporated into the probabilistic context-free grammar, which, in turn, can be used to generate effective guesses that include keyboard patterns. A keyboard pattern is a sequence of keystrokes on the keyboard, generally without regards to the actual characters typed, but that instead uses a physical sequence (shape) of the characters that can be remembered. A typical example is "qwerty" that starts with the letter "q" followed by the next 5 letters in sequence to the right. This pattern is often combined with other components to create the password, for example "qwerty2000".

In an embodiment, keyboard patterns can be added to the context-free grammar by including a number of these patterns in an attack dictionary. However, dictionaries do not differentiate patterns by their probability of occurrence and one can only afford to add a limited number of such patterns. Thus, it was chosen instead to solve the problem through modifications of the probabilistic context-free grammars, meaning that the incorporation of these structures is automatic during training and cracking. It is first discussed how keyboard patterns can be found in the training data.

A. Finding Keyboard Patterns and Ambiguity Issues in the Training Data

A keyboard pattern was modeled as a sequence of contiguous characters starting from some particular key. Contiguity was defined to be a key that is physically next to the specific key or is the same key. Any of the contiguous keys were allowed to be lower case or upper case. The algorithm accordingly finds the longest keyboard match in a password. It should be noted that there could be more than one keyboard combination in a password. It was assumed that a keyboard pattern had a length of at least three (3) characters.

B. Keyboard Patterns and PCFGs

It should be noted that any keyboard structure also has an original base structure (without using K, which represents the keyboard pattern). In order to maintain unambiguity of the grammar, a training algorithm was thus developed that generates a unique keyboard base structure associated with the original base structure if such a structure exists. If a password with an original base structure also has a keyboard base structure then the base structure was counted preferentially as the corresponding keyboard base structure rather than the original base structure. See Table II.

TABLE II

KEYBOARD BASE STRUCTURES DURING TRAINING

| Password | ORIGINAL | Keyboard |
|---|---|---|
| asdf | $L_4$ | $K_4$ |
| q1q1 | LDLD | $K_4$ |
| ASD1234QW | $L_3D_4L_2$ | $K_3D_4L_2$ |
| $%^& | $S_4$ | $S_4$ |
| qaz12zaq | $L_3D_2L_3$ | $K_3D_2K_3$ |
| q1!2 | LDSD | $K_4$ |

In lines 1 and 2, for passwords "asdf" and "q1q1", respectively, the count of the grammar rule S→$K_4$ would increase by two, and there would not be an increased count for the rules S→$L_4$ and S→LDLD. These counts are ultimately turned into transition probabilities for these rules. Further, if a password such as "john" was encountered, then the original base structure $L_4$ would be increased by one but there would be no corresponding keyboard structure. It should be noted that the notion of a context-free grammar can be maintained because a grammar rule such as S→$L_4$ is not able to derive an alpha string that is a keyboard pattern. A replacement for $L_4$ should not include keyboard patterns as they are derived from an attack dictionary that is under the user's control.

While the counts of the base structures are being determined during training, the counts of components (of a password) should also be determined, for example those in $D_1, \ldots D_j$ for j, the largest D-structure, and similarly for components in $S_1, \ldots S_m$ for m, the largest S-structure (special symbol). For example, encountering the password "ASD1234QW" would increase a $D_4$ count for substring 1234 by one. (As an aside, this substring would also be added to the $D_4$ list if it was not encountered previously.) Because of the way keyboard patterns are detected, the counts of the keyboard components in $K_3, \ldots K_p$ for p, the longest keyboard pattern, are also increased. The structure $K_3$ is the starting point because anything shorter than three for a keyboard pattern was not considered.

As a simplifying decision, it was assumed that a pure keyboard component including only digits (or only special characters) would preferentially be a digit (or special symbol) component rather than a keyboard component, since it is already captured as a D or S component. Thus, for a component, such as "1234" for example, there would be no reason to consider this a keyboard pattern rather than a $D_4$, as it does not affect the resulting effectiveness of the cracking, as long as it is in the grammar in one form or the other. Because of ambiguity, it was not considered both a keyboard pattern and a D4. Thus, in Table II, the password "$%^&" can be considered an S4, rather than a K4. The following general rules can determine whether or not a particular substring in a password should be classified as a keyboard pattern (K-structure) rather than an original structure (L, D, S):

1. If a substructure is purely digits or purely special symbols, it is classified as a D or S component.
2. Any substring of at least three (3) characters in length that does not fall under the first rule is classified as a K component if it is a keyboard pattern and is of maximal length. For example, "qwerty7800" is classified as $K_8D_2$.

C. Using a Training Dictionary

The above rules would, however, classify the password component "tree" as a $K_4$ rather than an L. It might be preferable, though, in certain situations, to view such components as English words. This choice may seem unimportant, but it does have consequences since an $L_4$ would be replaced by a four-letter word from the attack dictionary when cracking, but a $K_4$ would be replaced by a keyboard pattern.

In order to eliminate such (spurious) keyboard combinations being treated as keyboard patterns, a training dictionary can be used. During the training phase of determining the base structures, sections of passwords were analyzed, such that the sections of passwords not only could form a keyboard pattern but also are alphabet letters that could be a word in the training dictionary. The training dictionary is used to resolve ambiguity in this case as well as in more complex situations such as determining multi-words, as will become clearer as this specification continues. In this case, the training dictionary is used to prefer L-structures over K-structures. Typically, a moderate sized training dictionary of English words and proper names is used. It should be noted that the training dictionary may or may not necessarily be related to the cracking (attack) dictionary that is used as part of the password guess generation.

D. Implementing Probability Smoothing

One of the capabilities implemented in the original PPC [M. Weir, S. Aggarwal, M. Collins, and H. Stern, "Testing metrics for password creation policies by attacking large sets of revealed passwords," Proceedings of CCS '10, Oct. 4-8, 2010, pp. 163-175] but not discussed in detail in Weir et al. [M. Weir, S. Aggarwal, B. de Medeiros, and B. Glodek, "Password cracking using probabilistic context-free grammars," Proceedings of the 30th IEEE Symposium on Security and Privacy, May 2009, pp 391-405] is a variant of Laplacian smoothing. Consider for example $D_2$ where some of the two digit numbers are not found in the data. With smoothing, the PPC system would try all not-found two digit numbers with some lower probability based on a parameter. This was incorporated only for digits and special symbols below a certain length. As will be discussed, smoothing can also be used for keyboard combinations.

In order to smooth, data was first captured during the training process on the keyboard shapes (such as $r^5$ for "qwerty") found in the various keyboard patterns. Table III shows a small sample (ordered by highest probability) of the keyboard shapes of length 5 and patterns of length 6 that were found during a training session. Without smoothing, only the values in the complete list for $K_6$ patterns would be used when generating guesses for this component.

TABLE III

KEYBOARD SHAPES AND PATTERNS

| Shapes | PROBABILITY | PATTERNS | PROBABILITY |
|---|---|---|---|
| rrrrr | 0.261 | qwerty | 0.182 |
| ccccc | 0.261 | asdfgh | 0.036 |
| uceuc | 0.038 | aaaaaa | 0.029 |
| lcrlc | 0.024 | deedee | 0.023 |
| ueueu | 0.016 | poopoo | 0.019 |
| rlrlr | 0.015 | zxcvbn | 0.016 |
| rclrc | 0.014 | xxxxxx | 0.014 |
| eveve | 0.013 | 1q2w3e | 0.009 |

Consider values in C as different categories, with $N_i$ being the number of items found in category i. Let $N=\Sigma N_i$. The basic Laplacian smoothing assigns probability to an element in a category i by:

$$\text{Prob}(i) = (N_i + \alpha)/(N + C^*\alpha) \qquad (1)$$

In this equation, α is between 0 and 1, where 0 represents no smoothing and 1 represents a large degree of smoothing. For α=1, if 500 two-digit numbers were observed in the training set, but the number 33 was never encountered, the number 33 would be assigned a probability of: Prob (33) ≈0.0017.

For the case of keyboard patterns, a smoothed element was viewed as a specific keyboard shape applied to an applicable starting character. Suppose a password was found with the keyboard pattern "qwerty" of length six (6) in the training data. The starting character is "q", and the shape of the pattern is r5 of length five (5). It would be reasonable to try this pattern from other starting characters as well, such as "a" or "z" if these patterns were not found in the data.

Thus, for keyboard shapes found in the training set, all starting characters, excluding those that are not feasible (e.g., starting at "p" for shape r5), can be smoothed over. It should be noted that keyboard shapes that were not found were not smoothed over, though this is a reasonable compromise between smoothing everything and not smoothing anything. Furthermore, since the probabilities of the keyboard shapes were known, the smoothing can be adjusted for each shape to conform to the probability of that shape. Essentially, instead of smoothing across all keyboard strings, each keyboard shape found of a specific length were smoothed across. The smoothing function giving the probability of a keyboard pattern p of shape s is:

$$Prob(p) = Prob(s) \frac{N_i + \alpha}{\sum N_i + C\alpha} \qquad (2)$$

where Prob(s) is the probability of the keyboard shape s given the length of the keyboard pattern, $N_i$ is the number of times the ith keyboard pattern (of this shape) was found, α is the smoothing value, $\Sigma N_i$ is the sum of counts of the patterns found for shape s, and C is the total number of unique patterns for this shape.

Alpha Strings

It will be described herein how to improve the password cracking by understanding the patterns that occur in L-structures (also called alpha strings). Often when creating long passwords, users tend to prefer using alpha strings that are sentences or phrases or even just word combinations. In the original PPC of Weir et al., any alpha string can simply be replaced by a dictionary word of that length.

A. Using a Training Dictionary

As was done for keyboards, a training dictionary was used to support detection of relevant patterns. During training, the following different categories of L-structures were determined and employed, as also can be seen in Table IV.

A-word: A single word found in the dictionary

R-word: A word in the dictionary, repeated once

R-pattern: A non-dictionary word, repeated once

M-word: Two or more consecutive A-words, excluding R-words

A-pattern: Alpha string not in any previous category

TABLE IV

CLASSIFICATION OF ALPHA STRINGS

| CATEGORY | EXAMPLE |
|---|---|
| A-word (a single word) | password |
| R-word (repeated word) | boatboat |
| R-pattern (repeated pattern) | xyzxyz |
| M-word (multiword) | iloveyou |
| A-pattern (other pattern) | ahskdi |

The algorithms for learning these patterns will be described as this specification continues. This information can be incorporated into a probabilistic context-free grammar. For clarification, consider a simple example of deriving the grammar from the following small training set: {boatboat123, princess123, passpass456, iloveyou456, boatboat!!, passpass99}. Let R represent an R-word, A represent an A-word, and M represent an M-word.

There are two reasonable ways in which the grammar can be derived. In the first, the base structures can be derived directly from the start symbol S with new category symbols identifying the found patterns, as shown in Table V. This grammar would derive $S \rightarrow R_8D_3 \rightarrow boatboatD_3 \rightarrow boatboat123$ with probability $1/3 \times 1/2 \times 1/2 = 1/12$. It should be noted that in this case the probability of the base structure $R_8D_3$ may involve dependence on the $D_3$ part.

TABLE V

EXAMPLE OF FIRST DERIVATION APPROACH

| LEFT SIDE | RIGHT SIDE | RESPECTIVE PROBABILITIES |
|---|---|---|
| S → | $R_8D_3$ | $R_8D_2$ | $R_8S_2$ | 1/3  1/6  1/6 |
| S → | $A_8D_3$ | $M_8D_3$ | 1/6  1/6 |
| $D_3$ → | 123 | 456 | 1/2  1/2 |
| $D_2$ → | 99 | 1 |
| $S_2$ → | !! | 1 |
| $R_8$ → | boatboat | passpass | 1/2  1/2 |
| $A_8$ → | princess | 1 |
| $M_8$ → | iloveyou | 1 |

The second approach to derive the grammar is to have the derivation from S to the base structures as before (L, D, S, K) and then derive the subcategories from the L-structure. The previous example would now have grammar constructs as in Table VI.

This grammar would also derive the same string $S \rightarrow L_8D_3 \rightarrow R_8D_3 \rightarrow boatboatD_3 \rightarrow boatboat123$, but with probability $4/6 \times 4/6 \times 1/2 \times 1/2 = 1/9$. It should be noted that in this case the derivation with an L-structure on the left-hand side to its possible subpatterns is completed independent of the context.

TABLE VI

EXAMPLE OF FIRST DERIVATION APPROACH

| LEFT SIDE | RIGHT SIDE | RESPECTIVE PROBABILITIES |
|---|---|---|
| S → | $L_8D_3$ | $L_8D_2$ | $L_8S_2$ | 4/6  1/6  1/6 |
| $L_8$ → | $R_8$ | $A_8$ | $M_8$ | 4/6  1/6  1/6 |
| $D_3$ → | 123 | 456 | 1/2  1/2 |
| $D_2$ → | 99 | 1 |
| $S_2$ → | !! | 1 |
| $R_8$ → | boatboat | passpass | 1/2  1/2 |
| $A_8$ → | princess | 1 |
| $M_8$ → | iloveyou | I |

In certain embodiments of the current system, the second approach was used where there is context-free rewriting of the subpatterns of alpha strings from an L-structure. A reason for using this approach might be that larger sets of passwords on which to determine the probabilities should be considered as much as possible. By looking at all passwords that are L-structures, a fairly large set of passwords going to the subcategories can be obtained. If the base structures were considered as in the first approach, the training set of passwords for each base structure might be too small.

Although several categories of subpatterns of alpha strings were described herein, this set can be reduced to three main categories for simplicity. The A-word category can be combined with the A-pattern category since both categories require generating passwords from an attack dictionary. Until it is decided how differently the words from a dictionary are to be chosen for these two categories, it makes sense to combine them. Similarly, the R-word category can be combined with the R-pattern category. Further, M-words can be learned from the training set and added into the grammar with their probabilities. In this particular case, M-words (create other patterns not in the training set) are not smoothed over, but smoothing M-words is contemplated by the current invention, as the smoothing process was described previously.

1) Identifying Alpha String Categories

To detect A-words in the training set, the L-structure is checked to see if it is a word in the training dictionary. To detect if it is an R-word or an R-pattern, it is first checked for repetition and then checked if the pattern is in the dictionary. If the L-structure is not an A-word or R-structure, then it might be identified as an M-word. If it is not an M-word, it can be categorized as an A-pattern.

The M-word algorithm is relatively more complex as generally there are many ways to break up a multi-word into component words. It is of interest to find some legitimate multiword decomposition of the string and not necessarily the "best" one. An embodiment of the current algorithm finds the longest initial substring that is a word in the training dictionary and identifies this as a possible first component. This is done by starting at the rightmost character of the string. It then recursively calls the M-word algorithm on the remaining substring. If this does not result in a multi-word decomposition, it can be attempted with the next shortest initial substring that is a word.

B. Cracking Phase

The cracking code was modified to distinguish the new subcategories of L-structures that require handling in different ways. For the A category, using strings can be replaced from the attack dictionary. For the R category, the use of the dictionary can be modified when cracking to double each string in the dictionary. For the M category, the replacements can come directly from the grammar. It should be noted that the grammar also has information about capitalization of the L-structures, and that information is still used to create different masks for all of the subcategories.

Cracking Results with the New Grammars

Several different types of tests were run using the various patterns that were learned based on keyboard and alpha strings. Using several different datasets of revealed passwords, the effectiveness of the current PPC system was tested versus the original PPC of Weir et al. [M. Weir, S. Aggarwal, B. de Medeiros, and B. Glodek, "Password cracking using probabilistic context-free grammars," Proceedings of the 30th IEEE Symposium on Security and Privacy, May 2009, pp 391-405], and also against John the Ripper [The Open wall group, John the Ripper password cracker], and also in some cases against Hashcat [Hashcat advanced password recovery].

In the tests, the password list was divided into two separate sets: one for training the grammars and one for testing. In each series of tests, the specific datasets used are described herein, along with the comparative results. In a first series of tests, various versions of the keyboard grammar were compared against each other. In a second series of tests, the best of the keyboard versions was chosen, the alpha string grammar was added, and the current PPC system was compared against various password crackers.

A. Experimental Setup

To validate the results, several different revealed passwords sets of different sizes and origins were used for the experiments: Rockyou password set [A. Vance, "If your password is 123456, just make it hackme," New York Times, January 2010,] was the result of an attack on ROCKYOU-.COM in 2009; MySpace password set [R. McMillan, "Phishing attack targets MySpace users," InfoWorld, Oct. 27, 2006] was revealed in 2006; Hotmail password set [T. Warren, "Thousands of hotmail passwords leaked," Neowin, 2009] was revealed in 2009; Yahoo password set [S. Musil, "Hackers post 450K credentials pilfered from Yahoo", CNET, Jul. 11, 2012] is a more recent list from a SQL injection attack on YAHOO.COM in 2012; and CSDN password set [Bernd Chang, "6 Million User Data of China Software Developer Network (CSDN) Leaked", HUG China, Dec. 22, 2011] was the result of an attack on csdn.net, a Chinese language forum site in 2011.

The actual training and test sets that were used are as follows. All passwords were randomly chosen from the original lists. It should be noted that the test set was always different from the training set.

Combined-training: ½ million from Rockyou, combined with 30,998 MySpace and 4,874 from Hotmail.

Combined-test: the same numbers from the original lists as in Combined-training, excluding passwords from Combined-training.

Yahoo-training: 300,000

Yahoo-test: 142,762 remaining from the original list

CSDN-training: 300,000

CSDN-test: 150,000 remaining from original list

Rockyou-test: 142, 762 from other Rockyou

Generally, the goal was to have reasonable and similar sized test sets wherever possible. It was also a goal to use as many revealed passwords as possible for training. In the Combined-set, a mix of passwords from different revealed sets (there were only a fairly limited number of MySpace and Hotmail passwords available) was used. The CSDN set contained a few passwords with Chinese characters that were removed.

When using a training dictionary, a moderate sized dictionary of English words was always used based on the EOWL word list [Ken Loge, English Open Word List]. The EOWL word list was designed for SCRABBLE-style computer word games; it was augmented herein with common names and top words from television and movie scripts. The size of the training dictionary was 142,665 words. During the cracking phase, dic0294 [A list of popular password cracking wordlists, 2005] was typically used as the primary attack dictionary, and common-passwords [The Open wall group, John the Ripper password cracker] was used as the secondary attack dictionary. These were also used in the original PPC [M. Weir, S. Aggarwal, B. de Medeiros, and B. Glodek, "Password cracking using probabilistic context-free grammars," Proceedings of the 30th IEEE Symposium on Security and Privacy, May 2009, pp 391-405] and aids in the comparison between the novel PPC and the original PPC.

The number of guesses was limited to about 85 billion password guesses in most of the tests. This represents about two days of cracking on a typical laptop (2.4 GHz Intel Core 2 Duo using MD5 hashes). It should be noted that the number of guesses reported herein is beyond what is usually reported on in the literature when evaluating cracking techniques. When comparing the results to John the Ripper, incremental mode was used in John the Ripper, as incremental mode is said to be its most powerful cracking mode that eventually tries all possible character combinations as passwords.

B. Testing Keyboard Patterns

The relative effectiveness of using keyboard patterns in the grammars is addressed herein. Keyboard alone was considered, along with Keyboard plus Dictionary in which the training dictionary words were not counted as keyboard patterns. Two variations for each of these were also considered, based on whether there was smoothing or not.

In the first set of tests, shown in FIGS. 1A-1C, Combined-training was used for training, and the target set was Combined-test. FIGS. 1A-1C show the results of comparing each of the 4 keyboard variations across portions of the cracking curve (early, middle and late). The term "cracking curve" is used herein to refer to graphing the number of passwords cracked (or the percent) on the Y-axis against the number of guesses up to the maximum that were generated (~about 85 billion guesses). The notion of improvement was also used to compare two different cracking curves U(x) and V(x). By definition, as used in Weir et al. [M. Weir, S. Aggarwal, B. de Medeiros, and B. Glodek, "Password cracking using probabilistic context-free grammars," Proceedings of the 30th IEEE Symposium on Security and Privacy, May 2009, pp 391-405], the improvement of U over V at x is simply $U(x)-V(x)/V(x)$.

FIGS. 1A-1C show that the Smoothed Keyboard grammar is not as effective as the other grammars in the very beginning (Early), but it is the best very soon (about 1.5 billion guesses) and maintains this for the rest of the cracking curve. The four keyboard-variation tests were repeated as in FIGS. 1A-1C on the YAHOO and CSDN sets, and these tests had similar results.

The goal of using a training dictionary was to maintain a structure that is probably a word (from the user's perspective) as an L-structure and thus try a variety of words from the attack dictionary as replacements in that structure. An objective was to distinguish keyboard patterns that are really, in some sense, user keyboard patterns and are not "artifact" keyboard patterns simply because they have an embedded keyboard structure (such as the word "ease"). Although eliminating such keyboard patterns seemed natural and it was expected that this kind of grammar would perform better, the results showed otherwise.

In general, both Smoothed Keyboard and Keyboard were clearly better than the Dictionary versions with Smoothed Keyboard being slightly better. The Smoothed Keyboard version (hereinafter "S-Keyboard") was thus used generally whenever keyboard grammars were considered in the subsequent results that will be discussed.

C. Testing Alpha Strings

Figure 2:
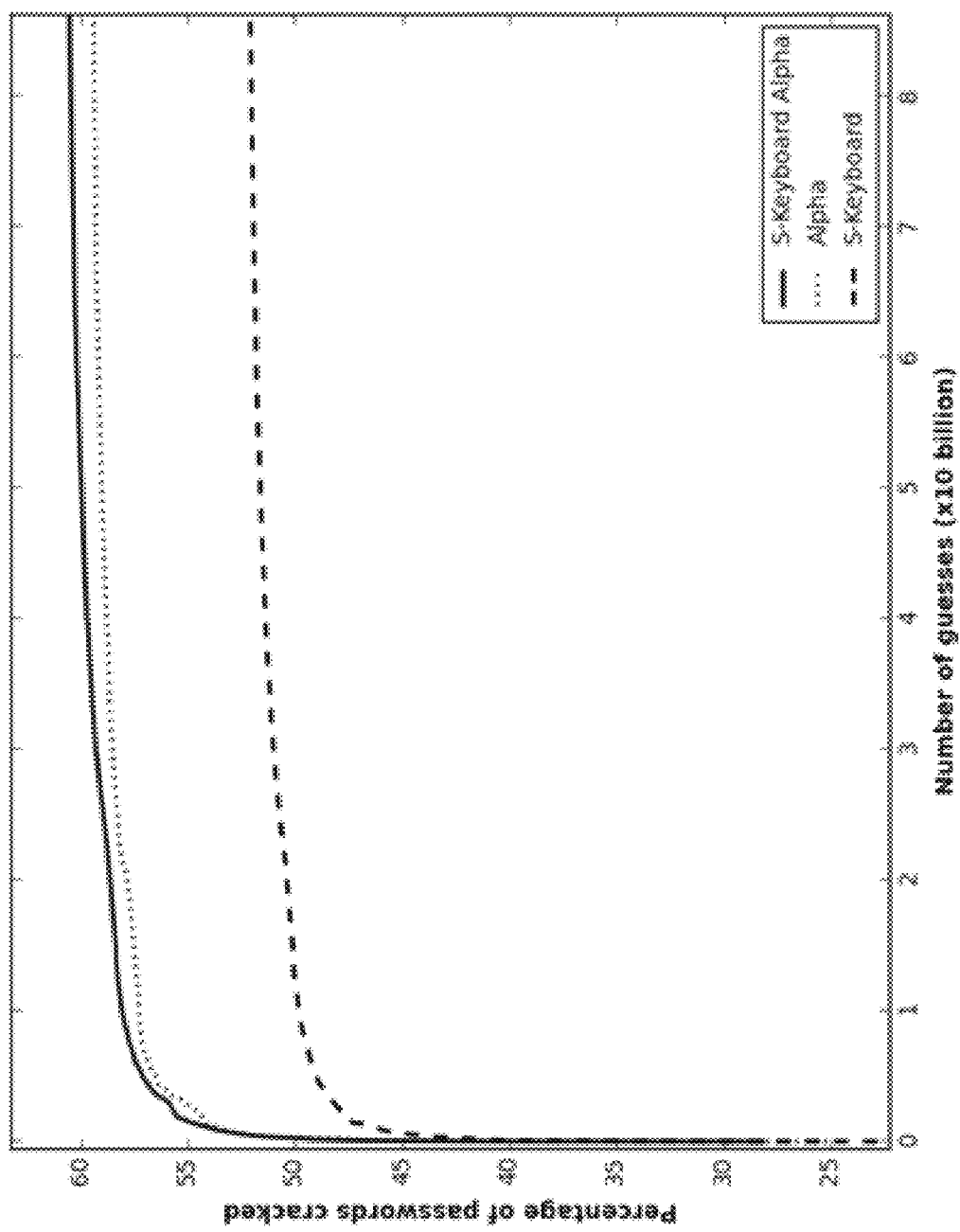
FIG. 2 is a graphical illustration depicting results for Alpha grammar using Combined-set.

The effectiveness of learning the subcategories of alpha strings is tested and discussed herein. The grammar that learns these subcategories can be called the Alpha grammar. In this series of experiments, the effectiveness of using the S-Keyboard grammar alone, using the Alpha grammar alone, and using both S-Keyboard and Alpha patterns (S-Keyboard Alpha grammar) were compared. FIG. 2 shows the cracking curve on Combined-set.

The results show that adding the Alpha Grammar results in a substantial improvement in the cracking. However, learning both classes of Keyboard and Alpha patterns is better than each alone. These results are consistent over the whole cracking curve and apply from the early beginning of the cracking until the end.

These tests were repeated on Yahoo-set and CSDN-set. The results were very similar with S-Keyboard Alpha being the best over the cracking curve.

D. Comparison with Other Password Crackers

As seen, S-Keyboard Alpha was found to be the best against the other grammar versions. Herein, the current PPC system, which uses the S-Keyboard Alpha grammar, is compared against three other password crackers: original PPC, John the Ripper and Hashcat. In the first set of results reported, the first three password crackers (current PPC, original PPC, and John the Ripper) are compared via training and testing on Combined-set.

Figure 3:
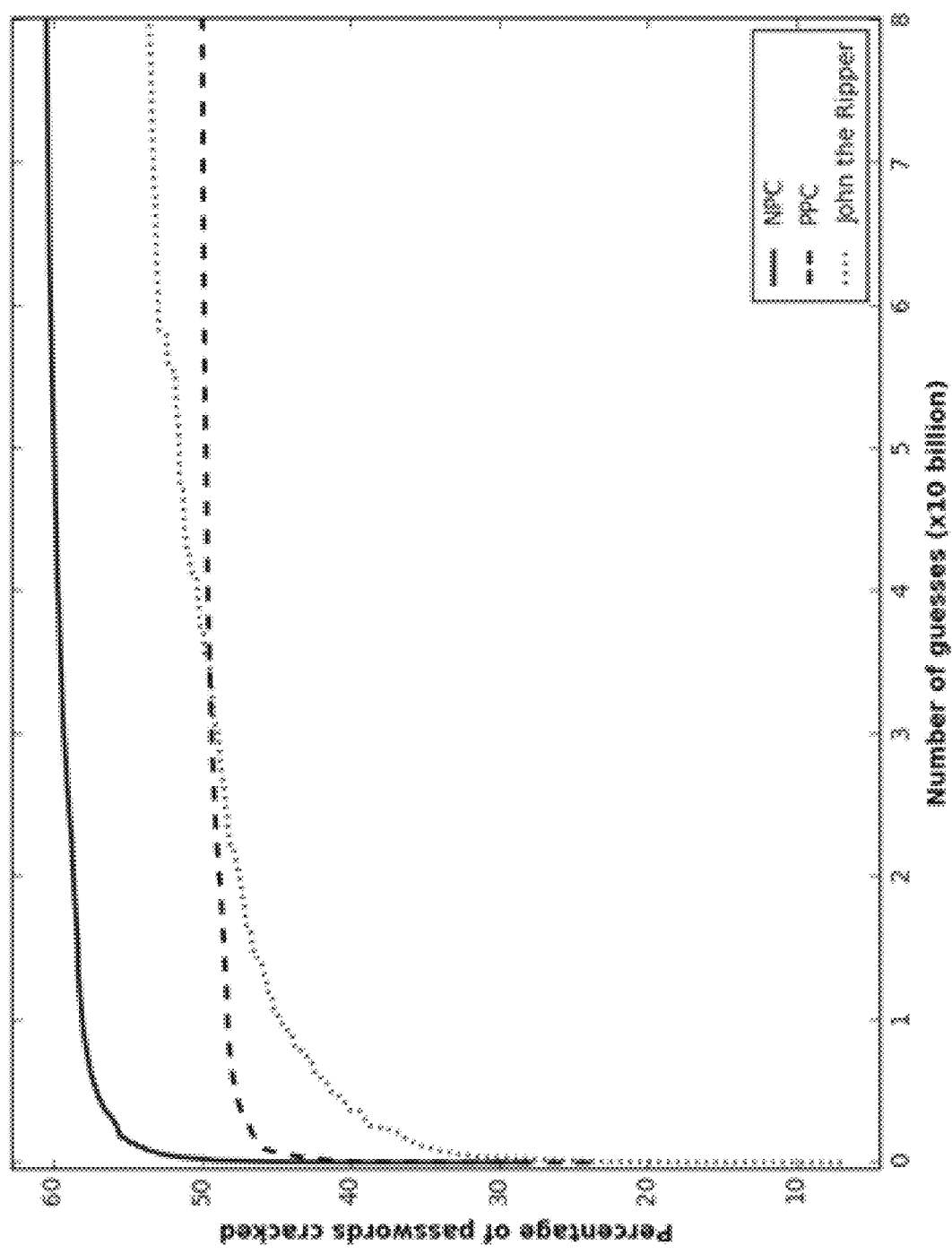
FIG. 3 is a graphical illustration comparing password crackers using Combined-set.

FIG. 3 shows that the current PPC is substantially more effective as compared with both the original PPC and John the Ripper over the full cracking curve. The improvement of the current PPC over John the Ripper ranged from 13% to 305%. The improvement of the current PPC over the original PPC ranged from 15% to 22%.

The current PPC was also tested against original PPC and John the Ripper using both Yahoo-set and CSDN-set. The results were similar to those for Combined-set. For Yahoo-set, the improvement of current PPC over original PPC ranged from 1% to 16%, and for CSDN-set, the improvement ranged from 14% to 17%.

Current PPC was also compared against Hashcat using two rule sets: Best64 and Deadone (d3ad0ne) [Hashcat advanced password recovery](these are the two rule sets mostly recommended for Hashcat by those in the art). Since these two rule sets are quite small, the guesses generated were only 64.5 million and 21 billion, respectively, and thus the cracking stops for Hashcat after this many guesses, as seen in the figures. The same dictionaries as in the previous experiments were used, and Combined-set was also used, as before. FIG. 4A shows the comparison of the Best64 rule set with the other three password crackers, and FIG. 4B compares the Deadone rule set. The current PPC is dominant in both figures. The improvement of the current PPC system over Hashcat at the end of the Hashcat cracking with Best64 was 42% and with Deadone was 16%.

FIG. 4A also shows the very beginning of the cracking curve in more detail than can be seen in FIG. 3. It can be seen that the current PPC is significantly more effective in both the short run as well as in a longer run. This is particularly important when there is limited time for cracking.

E. Cross Testing

In the series of tests reported on so far, the training and testing has been conducted on sets from similar data. This is where both current PPC and original PPC have the advantage of training on a set that is similar to the target set. It is often the case that one might not know the target or might not have sufficient training passwords available. Thus, in the next series of tests shown in FIGS. 5A-5B, this issue is explored.

Figures 5A, 5B:
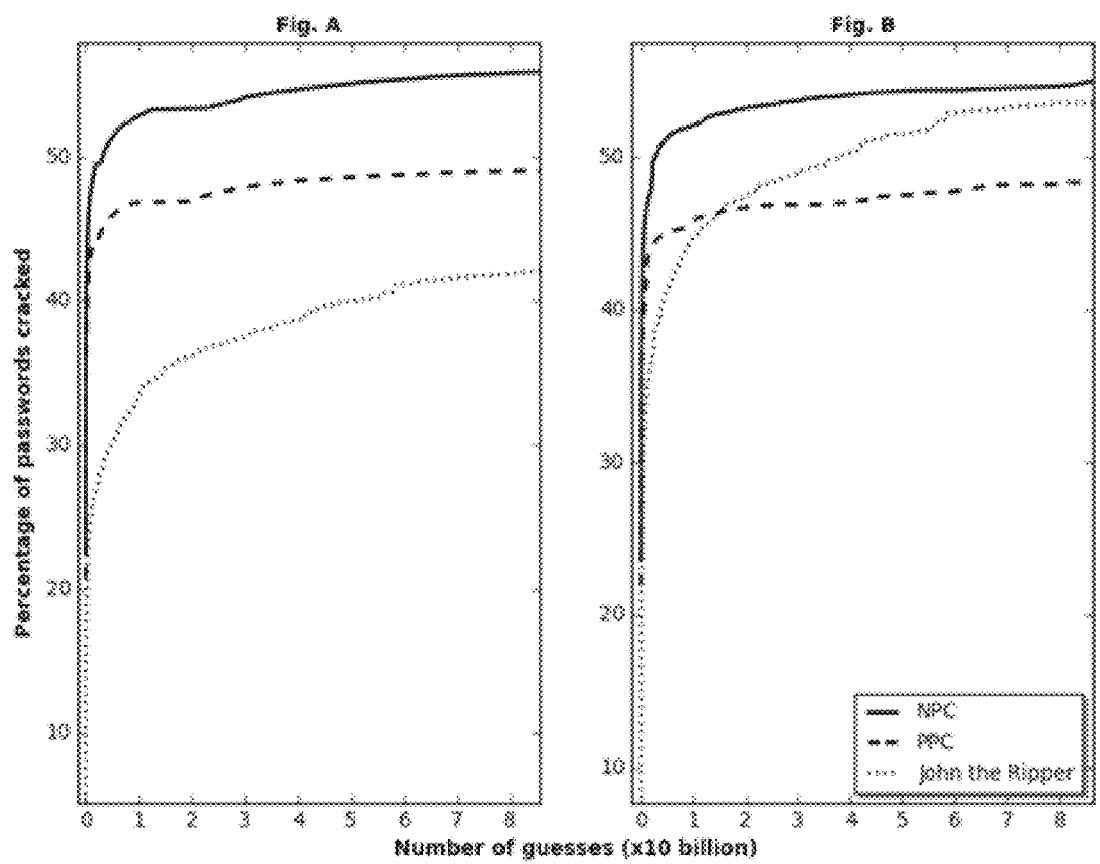
FIG. 5A is a graphical illustration comparing password crackers using Combined-training and Yahoo-test.
FIG. 5B is a graphical illustration comparing password crackers using Yahoo-training and Combined-test.

Combined-training was used to train both original PPC and current PPC and test on Yahoo-test, as seen in FIG. 5A. The improvement of current PPC over original PPC ranged from 8% to 14%, and the improvement over John the Ripper was 33% to 331%. Similarly, Yahoo-training was then used, and Combined-test was tested, as seen in FIG. 5B. The improvement of current PPC over original PPC ranged from 8% to 15%, and the improvement over John the Ripper was 2% to 240%. As can be seen, currently PPC can be seen to be still more effective than the other two crackers.

By adding the new patterns to current PPC, no difference was noticed in the rate that the system was able to create guesses, so it was seen that current PPC was as fast as original PPC in generating guesses.

Defining Metrics for Dictionary Attacks

Described herein is an analysis of the effectiveness of different attack dictionaries for probabilistic password cracking. Metrics are defined to help analyze and improve attack dictionaries. Using the approach described herein to improving the dictionary, an additional improvement of about 33% can be achieved by increasing the coverage of a standard attack dictionary. Combining both approaches (i.e., improving the attach dictionaries and incorporating keyboard patterns), an improvement of about 55% can be achieved over the current state of the art. The tests were performed over fairly long password guessing sessions (up to 85 billion) and thus show the uniform effectiveness of the current techniques for long cracking sessions.

In order to simplify writing and viewing a particular shape of a keyboard pattern, the following terminology can be used: an upper left key relative to the current key is denoted by the symbol "u"; an upper right key relative to the current key is denoted by the symbol "v"; the same key relative to the current key is denoted by the symbol "c"; the left key relative to the current key is denoted by the symbol "l"; the right key relative to the current key is denoted by the symbol "r"; the lower left key relative to the current key is denoted by the symbol "d"; and the lower right key relative to the current key is denote by the symbol "e". For example, given the password "qw34!99", the keyboard pattern ("qw34") of length four (4) starts with "q" and has the keyboard shape rvr.

The keyboard pattern is introduced into the grammar as a new non-terminal symbol K. The base structure of the password "qw34!99" is thus $K_4S_1D_2$. Note that for this example, the original base structure would have been $L_2D_2S_1D_2$. In original PPC, since L, D, S, were mutually exclusive character sets, the grammars were unambiguous. By incorporating K, the ambiguity problem can be alleviated since a single K-structure can contain elements of all the character sets.

Generating guesses in highest probability order using a context-free grammar relies on the grammar being unambiguous. This ensures that there is a well-defined probability for a guess that only depends on a single unique derivation. A grammar is ambiguous if there are two or more different derivation trees for a terminal string. Consider the following grammar:

S→L₅D₃|L₅K₃
  L₅→alice
  D3→131|123
  K₃→123|asd

This grammar is clearly ambiguous (for example two derivations for the password string "alice123"). Since it is important that the grammar be unambiguous, this can be enforced through choosing that certain base structures never derive certain terminal strings. Using the current technique, this is essentially able to be accomplished.

Attack Dictionaries

In dictionary based attacks, a list of words called an attack dictionary (or just dictionary) is used along with different mangling rules to create password guesses. Therefore, in order to correctly guess a password, not only does the attacker need to apply the right mangling rule, but the right word also needs to be included in the dictionary. The probabilistic password cracker takes care of the word-mangling rules by automatically deriving them (using the context-free grammar) from a training list of real user passwords. However, the attacker still needs to explore how to best choose the attack dictionaries since their size and content can affect the guesses and the probabilities.

Currently, the dictionaries used in password cracking are typically a list of common passwords that have been cracked previously or a list of English words that have been experimentally shown to be effective. Although some common password lists exist (derived from passwords cracked or disclosed passwords), there are few studies showing the effectiveness of such lists for a probabilistic password cracker.

As noted previously, using a dictionary of actual guesses is quite different from finding a good dictionary to be the base for the alpha string substitutions, as used in original PPC and current PPC. For any base structures in current PPC containing A-structures or R-structures, all words of the same length from the dictionary would be tried at the same time because of the assumption that all words of the same length from one dictionary have equal probability. Thus, for example, doubling the size of an attack dictionary is not a cost problem in terms of the size of the dictionary with respect to cracking per se. Guesses will still be generated quickly and in highest probability order. However, the probability of the guesses will change and thus the guesses will be tried in a different order. Furthermore, new combinations would likely be tried (which is good since there are more alpha words to replace), but too many words for the same alpha string component in a base structure would reduce the probability of each of the guesses, so they might not be tried until much later (which possibly can be bad). On the other hand, a very small dictionary might not be effective at all because it will obviously reduce the variety and number of guesses.

The original PPC and current PPC have the capability of using multiple attack dictionaries when cracking passwords. Probability values can be assigned to each dictionary, and therefore different probability values can be applied to different sets of words.

There have been no studies, however, that explore how to use multiple dictionaries effectively in probabilistic password cracking. The difficulty in regards to designing such studies is the number of variables that change at the same time in regard to dictionaries and more specifically with regards to multiple dictionaries in probabilistic password cracking. In fact, when cracking, the number of dictionaries used, the weights assigned to each dictionary, the usefulness of actual words in the dictionary, as well as the probability values assigned to each word in each dictionary (which depends on the length of the dictionary and also depends on the number of duplicate words that exist in multiple dictionaries) can all affect the results. This problem space was explored and is described herein by trying to keep as many features as possible constant and varying only a few.

It is also described herein how to make the attack dictionaries for current PPC better or more effective. The improvements of the more effective attack dictionaries were seen to be quite significant and could likely be used to make the attack dictionaries more effective for other password cracking systems. Metrics were first developed to compare dictionaries, and then the results are subsequently presented herein.

A. Measuring the Effectiveness of a Dictionary

A basic question is the effectiveness of one dictionary can be measured as compared to another. The effectiveness of a dictionary was measured by considering its coverage and precision with respect to a target set (set of passwords to be cracked).

Let W be a set of words $\{w_1 \ldots w_n\}$ that is going to be used as a dictionary and let T be a target set of passwords $\{p_1 \ldots p_m\}$. A word w is found in T if it is an L-structure in at least one of the passwords. Let $I(w, T)=1$ if w is found in T and $I(w, T)=0$ otherwise. Precision of a dictionary W with respect to a target set T is then defined as:

$$P(W, T) = \frac{1}{|W|} \sum_{i=1}^{n} I(w_i, T) \qquad (3)$$

Assume a password p has k different L-structures in it. Let the count $c(w, p)$ be the number of L-structures in p that have the value w. Coverage of a word w with respect to a password p (and naturally extended to T) is defined as:

$$C(w, p) = \frac{c(w, p)}{k} \; \& \; C(w, T) = \sum_{i=1}^{m} C(w, p_i) \qquad (4)$$

$T_L$ is defined as the subset of passwords in T that have at least one L-structure. Coverage of a dictionary W and target set T is:

$$C(W, T) = \frac{1}{|T_L|} \sum_{i=1}^{n} C(w_i, T) \qquad (5)$$

Only the passwords that have L-structures were considered because the dictionary has no relevance to cracking the passwords that have no L-structures. Note that $0 \leq C(W, T)$, $P(W, T) \leq 1$. Precision is a measure of how compact the dictionary is for the target set. For an ideal precision measure of 1, a dictionary should only include all the words that appear in the target set. Coverage measures how useful the words of a dictionary are for potentially cracking the passwords in the target set. For an ideal coverage measure of 1, every L-structure of the target set should be a word in the dictionary. A perfect dictionary ($D_T$) for a target T is defined as the set of all words that appear in T. This prefect dictionary has both coverage and precision equal to 1 and the words in the perfect dictionary can be ordered by their individual coverage values $C(w, T)$.

In the experiments, the metrics to measure dictionaries against a given target set were applied. Then, the metrics were tested to see how good they were against other target sets.

Testing Attack Dictionaries

Typically, a primary attack dictionary and a smaller secondary attack dictionary are used when cracking with the current PPC, though this is not required. In testing, the effectiveness of different primary dictionaries was first explored. Various secondary dictionaries were then used and analyzed for the additional utility on the success of the cracking. The final results will then be described herein for the complete current PPC system, including the S-Keyboard Alpha grammar and the improved dictionaries.

A. Testing Primary Dictionaries

Different dictionaries are compared herein, thus leading to a description of how to create more effective ones using the current metrics. Since dictionary dic0294 has been used herein in testing, it can be used as a base for the comparisons and improvements. This dictionary has strings containing digits and special characters, which were removed. This results in a dictionary of size 728,216. When comparing with other attack dictionaries, dictionaries of a similar size were created. From John the Ripper's wordlist collection [The Open wall group, John the Ripper password cracker], a dictionary of English words was created having about the same size. A dictionary of a similar size was also created from 2.5 million randomly chosen Rockyou passwords by stripping out the alpha string components and removing duplicates. The coverage and precision of each of these dictionaries with respect to Combined-test (target T) turned out to be similar. Each of these dictionaries was tested against Yahoo-test, and it was found that the cracking curves were consistent with the precision and coverage metrics, with better rates of cracking for dictionaries having higher coverage/precision.

Different dictionaries were then created from dic0294 by systematically altering coverage and precision to see how the cracking changes. In the first series of experiments, the baseline dic0294 was and its metrics were calculated with respect to the target Combined-test.

C(dic0294, TCombined)=0.54, P(dic0294, TCombined)=0.06

Two dictionaries were then created as variants of dic0294, increasing the coverage to 0.7 and 0.9, respectively, without changing the precision. These variants can be called dic0294_c70 and dic0294_c90, respectively. The sizes of these variants increased to about 1.56 million and 2.58 million, respectively.

To increase the coverage of a dictionary D with respect to a target T, words were added from the perfect dictionary $D_T$ to D. It should be noted that optimally achieving a specific coverage value is actually a Knapsack problem [Michael Garey and David S. Johnson, "Computers and Intractability: A Guide to the Theory of NP-Completeness," W.H Freeman and Co. 1979], but the heuristic of adding words in highest coverage order works fairly well in this case. Let n, be the number of words added from $D_T$ to increase the coverage of D to the desired amount. To maintain the precision P of D, $n_n$ words that are not in $D_T$ were also added. The following formula can then be derived:

$$n_n = n_t\left(\frac{1}{P} - 1\right) \quad (6)$$

Figures 6A, 6B:
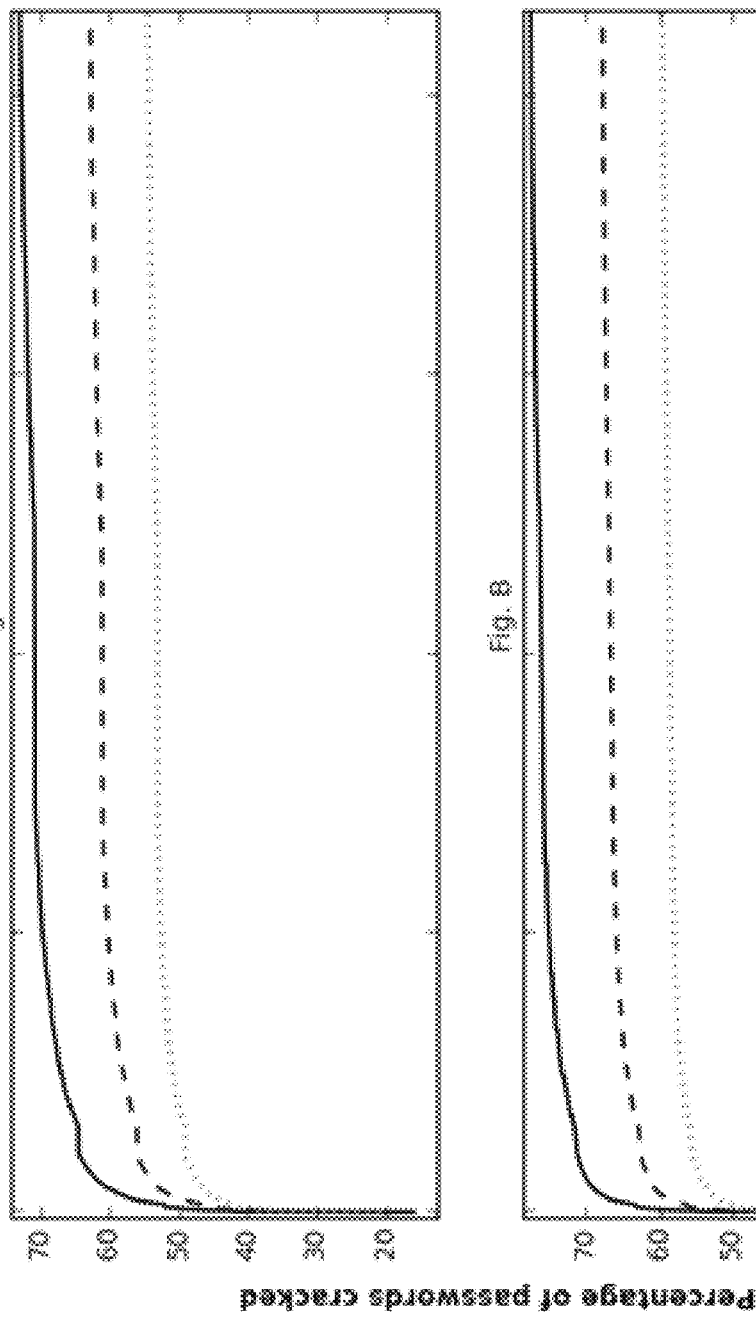
FIG. 6A is a graphical illustration depicting Dic0294 variants with precision fixed at 0.06, using Yahoo-test as target.
FIG. 6B is a graphical illustration depicting Dic0294 variants with precision fixed at 0.06, using Rockyou-test as target.

Since in cracking the actual target set would not be known, the use of the metrics derived from target Combined-test was explored by testing how well the derived dictionaries would do on the targets Yahoo-test shown, shown in FIG. 6A, and Rockyou-test, shown in FIG. 6B. In this experiment, Combined-training was used for training using the current PPC.

The results were seen to be remarkably good and support the premise of the current metrics approach. In FIG. 6A, the average improvement in cracking over the entire cracking curve when using dic0294_c90 over dic0294 was 33%. Similarly, in FIG. 6B, the average improvement over the cracking curve was 30%. Not only that, the coverage metrics were subsequently checked relative to the new targets, and it was determined that coverage on one test set seems to map appropriately to coverage on the different target sets. For example, although the initial coverage for dic0294_c90 was derived from Combined-set (90%), its coverage when measured on both targets is very similar, as indicated in Table VII.

An analogous series of tests was also performed on the same targets where the coverage of dic0294 was maintained at the baseline, and two other variant dictionaries dic0294_p10 and dic0294_p20 were creating, thus increasing the precision to 0.1 and 0.2, respectively. In order to do this, words not in Dr were removed from the dictionaries, and their sizes decreased to about 450,000 and 225,000, respectively. It was expected that the higher precision dictionaries might do better in cracking, but it was found that the higher precision dictionaries actually performed worse, as their coverage with respect to the targets actually decreased, as seen in Table VII. This is an indication that coverage is extremely important and may be more important than precision.

TABLE VII

| COVERAGE AND PRECISION FOR TARGET SETS | | | | |
|---|---|---|---|---|
| | YAHOO-TEST | | ROCK-YOU-TEST | |
| | COVERAGE | PRECISION | COVERAGE | PRECISION |
| dic0294 | 0.57 | 0.037 | 0.54 | 0.03 |
| dic0294_c70 | 0.71 | 0.028 | 0.69 | 0.02 |
| dic0294_c90 | 0.9 | 0.025 | 0.89 | 0.02 |
| dic0294_p10 | 0.53 | 0.051 | 0.52 | 0.04 |
| dic0294_p20 | 0.50 | 0.087 | 0.5 | 0.075 |

The results of these tests with attack dictionaries show that the metrics for measuring dictionaries can be extremely useful in creating and comparing dictionaries. The algorithms to improve the coverage and precision of the dictionaries have also been implemented as part of the current PPC system. Note that it is often stated that there are diminishing returns from larger dictionaries. The work indicates that if a larger dictionary is created in the manner recommended, the cracking improvement is certainly substantial. The diminishing returns if any have been pushed back quite far.

B. Testing Secondary Conditions

In the series of tests described herein, the secondary dictionaries were explored. A primary dictionary dic0294 was used, along with two secondary dictionaries: (1) common-passwords (which is presumably an "optimized" dictionary) that contains 815 words; and (2) TopWords (a list of the highest frequency A-words and A-patterns found in the training set) that also contains 815 words. In this series of tests, a probability of 0.9 was assigned to the primary dictionary, and a probability of 0.1 was assigned to the secondary dictionary. It should be noted that the probability values assigned to the dictionaries actually give higher weight to the words in the secondary dictionary. Since the primary dictionary has far more passwords than the secondary dictionary, the probability of each word in that dictionary (1/nL, where nL is the number of words in the dictionary of length L) is much smaller, and multiplying with the weight 0.9 still makes it a fairly small number compared to the probabilities of the words in the secondary dictionary.

In this series, Yahoo-test was cracked using the current PPC system trained on Combined-training. Primary dictionary dic0294 was first used without a secondary dictionary. The same set was then cracked by adding common-passwords as the secondary dictionary, and then the same set was cracked by adding TopWords as the secondary dictionary. The results showed that using TopWords as the secondary dictionary is more effective than using common-passwords, which is, in turn, better than not using any secondary dictionary. The improvement of using TopWords over not using a secondary dictionary is 1.3%. Although the improvement is relatively small, it should be noted that the specific chosen secondary dictionary is somewhat important and further analysis and testing could decide what kinds of secondary dictionaries are actually optimal.

Further analysis on the secondary dictionaries showed that all words in the common-passwords list and also all words in the TopWords list happen to be already included in dic0294. Thus, it can be concluded that the improvement when using a secondary dictionary is not because new words have been added by the secondary dictionary but because of the differential weights given to the sets of words as a result of adding the secondary dictionary.

Different sizes of the secondary dictionary were also tested. Different sizes of TopWords were created by selecting 400, 800, 1600, 3200 and 6400 of the highest frequency words from the training set. For the primary dictionary, the largest TopWords was added to dic0294. One might think that the larger the secondary dictionary, the better the results might be, particularly since the secondary dictionaries are all fairly small. This was true for sizes up to 3200. However, at size 6400, the advantage of giving higher probabilities to some sets of words no longer existed, and at this level, it became virtually equivalent to not using a secondary dictionary at all.

C. Final Testing Using Current PPC with Improved Dictionaries

Figure 7:
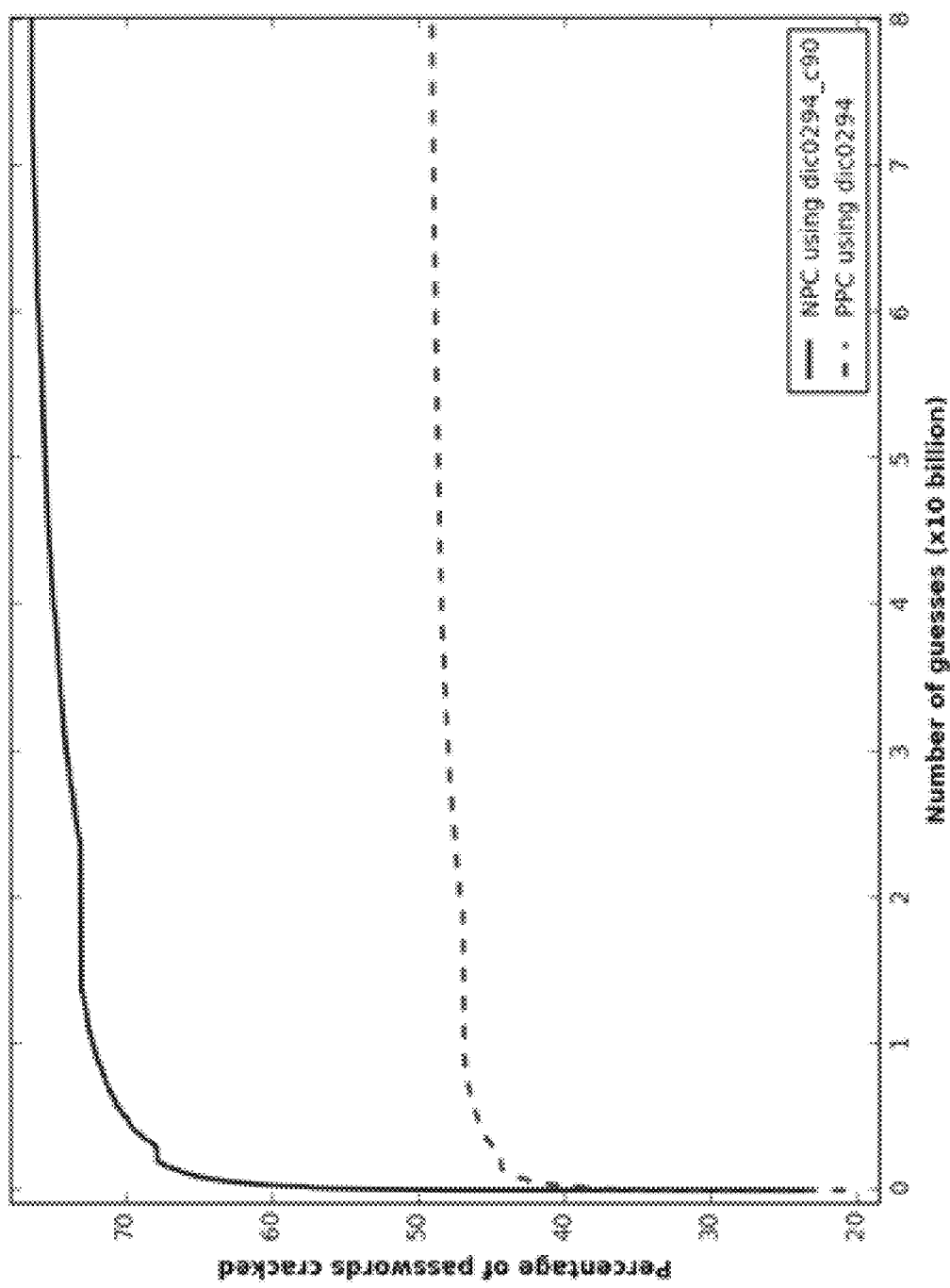
FIG. 7 is a graphical illustration depicting results using all the techniques discussed, with Combined-training and yahoo-test.

In a final test, all of the advancements described herein were combined: new patterns (keyboard), and improved primary and secondary attack dictionaries. This was then compared against original PPC. Combined-training was used and Yahoo-test was tested against. In FIG. 7, the following comparison is shown: current PPC using the dictionaries dic0294_c90 and TopWords3200 versus original PPC using dic0294 and common-passwords. At the end of the cracking run, original PPC had cracked 76% of the passwords and exhibited an average improvement over original PPC of 55%. With respect to the effectiveness of current PPC in the early part of the cracking curve, 70% of the passwords were cracked within 5 billion guesses, which translates to under three hours on a regular laptop computer. It should be noted that improvements in cracking that is based on parallelism or hardware support are orthogonal to current approach and can also be used with this system.

Keyboard and Alpha String Usage

Described herein are some keyboard patterns and alpha string usage statistics compiled in the course of the testing based on the password sets used. Table VIII shows the percentage of passwords that contain keyboard patterns and digits for each set tested. Between about 11% and about 20% of passwords contain at least one keyboard pattern of length three (3) or more. Only about 0.5% to about 1.4% of passwords are entirely made up of keyboard patterns. The CSDN passwords have a lower percentage of passwords that partially contain keyboard patterns but a higher percentage of passwords that consist entirely of keyboard patterns. However, CSDN passwords also have an unusually large amount of digits (3 times as often as Combined-set), which may include keyboard patterns.

TABLE VIII

% PASSWORDS CONTAINING KEYBOARD/DIGIT PATTERNS

|  | COMBINED | CSDN | YAHOO |
|---|---|---|---|
| Some Keyboard | 14.46% | 10.93% | 16.92% |
| All Keyboard | 0.45 | 1.40% | 0.61% |
| Some Digits | 54.09% | 86.37% | 63.06% |
| All Digits | 15.52% | 45.09% | 5.90% |

Table IX shows the most frequently used keyboard shapes for lengths 5-7 in Combined-set. As the length of the pattern gets longer, the shapes were found to be simpler. For example, for keyboard shapes of length 16 and higher (not shown in the figure), $c''$ was seen 100% of the time.

TABLE IX

MOST COMMON KEYBOARD SHAPES FOR LENGTHS (5-7) IN COMBINED-SET

| 5 | | 6 | | 7 | |
|---|---|---|---|---|---|
| SHAPE | PROB | SHAPE | PROB | SHAPE | PROB |
| rrrrr | 0.261 | rrrrrr | 0.281 | ccccccc | 0.158 |
| ccccc | 0.146 | cccccc | 0.126 | eveveve | 0.099 |
| uceuc | 0.038 | llllll | 0.064 | rrrrrrr | 0.095 |
| uceuc | 0.038 | rrrrru | 0.0234 | ueueueu | 0.028 |
| lerle | 0.024 | rrrrrd | 0.0234 | rdrdrdr | 0.024 |
| ueueu | 0.015 | errrrr | 0.0175 | uuureee | 0.024 |
| rlrlr | 0.014 | rrrrre | 0.0175 | leurleu | 0.024 |
| rclrc | 0.014 | urrrrr | 0.0146 | vdvdvdv | 0.020 |
| eveve | 0.013 | cccccd | 0.0117 | rlrlrlr | 0.020 |

Figure 8:
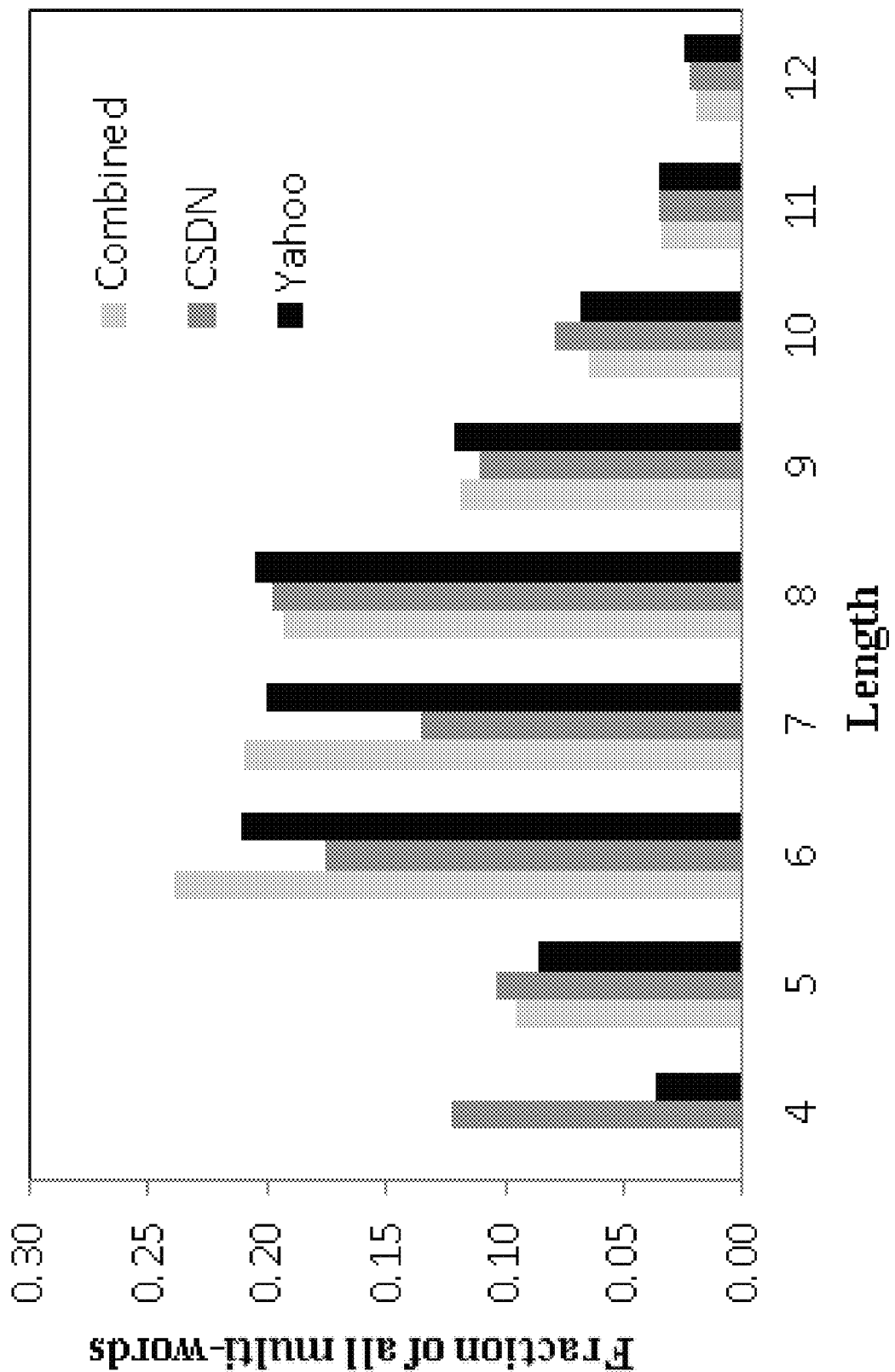
FIG. 8 is a graphical illustration depicting the fraction of all multi-words that are of the given length.

With respect to the subcategories of alpha strings, very few repeated patterns were generally, and only multi-words were considered, as seen in FIG. 8. FIG. 8 shows the frequency of each length of all multi-words found. This may simply be consistent with the number of passwords of each length.

Figure 9:
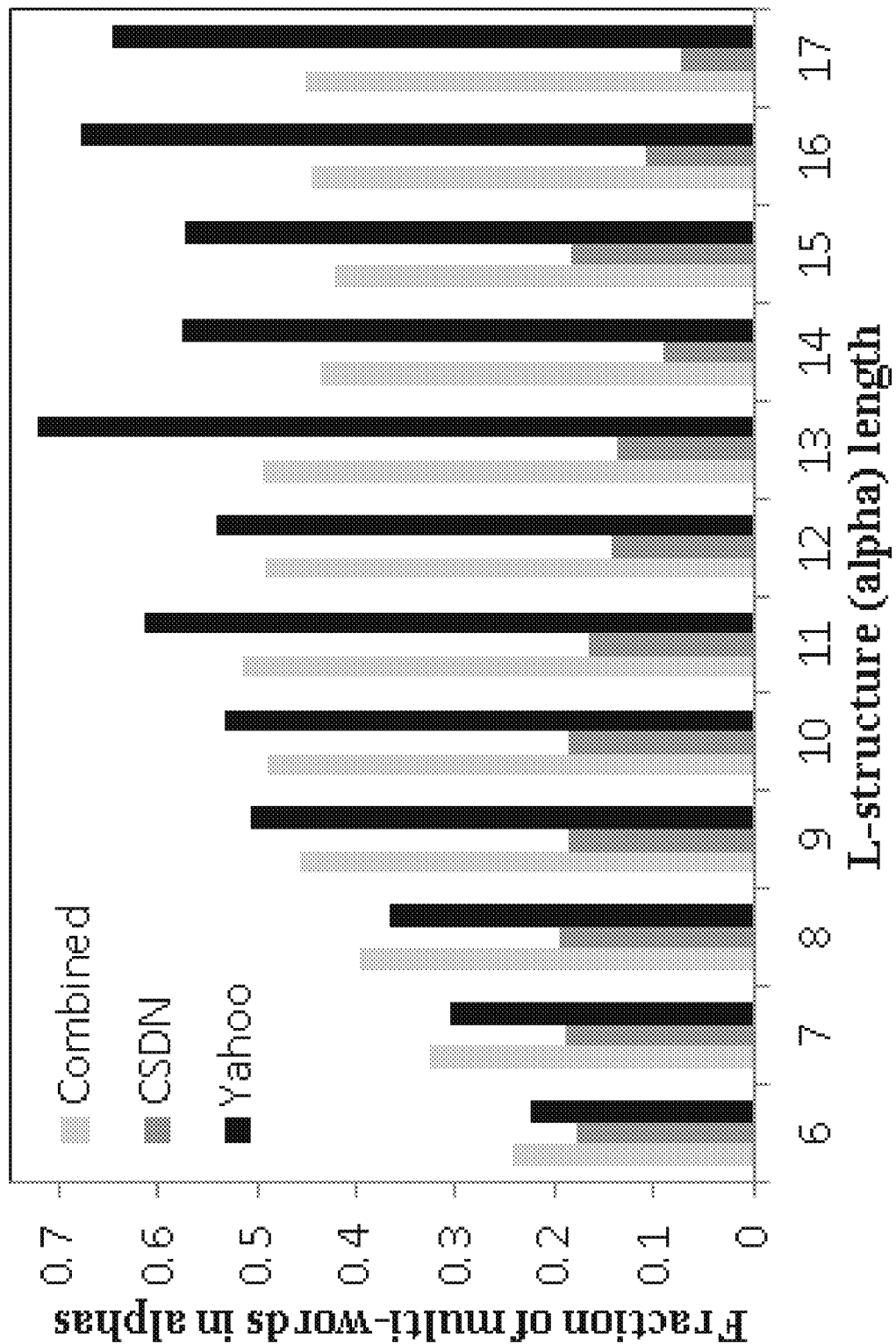
FIG. 9 is a graphical illustration depicting the fraction that are multi-words for each length L-structure.

For each length, FIG. 9 shows the fraction of L-structures that are multi-words. It illustrates that there is a greater tendency to use multi-words for longer length passwords. Also, since the Yahoo-set is more recent, this might also indicate that it is becoming more popular to use multi-words over time.

In conclusion, it has been shown herein how to add keyboard patterns and alpha string patterns into PCFG based password cracking in a systematic way and how to ensure that the resulting grammars are still essentially unambiguous. A similar approach to other types of patterns could also be undertaken, for example Leetspeak replacements and removal of vowels in words. It has also been shown herein how smoothing of patterns can be done in keyboard patterns and how this could also be applied to multi-words. Metrics were introduced for attack dictionaries, and it was seen how they can be easily used for comparing dictionaries and improving them. The improvement of the resulting current PPC system is significant, as the results for long cracking sessions of 85 billion guesses show the consistent effectiveness of the current PPC system both in the early phase and the later phase of the cracking curve. It is envisioned that the techniques described herein can be applied to other cracking systems as well.

REFERENCES

M. Weir, S. Aggarwal, B. de Medeiros, and B. Glodek, "Password cracking using probabilistic context-free grammars," Proceedings of the 30th IEEE Symposium on Security and Privacy, May 2009, pp 391-405.

The Open wall group, John the Ripper password cracker.

Narayanan and V. Shmatikov. "Fast dictionary attacks on passwords using time-space tradeoff," CCS'05. November 2005.

M. Dell'Amico, P. Michiardi and Y. Roudier, "Password strength: an empirical analysis," Proceedings of IEEE INFOCOM 2010.

P. G. Kelley, S. Komanduri, M. L. Mazurek, R. Shay, T. Vidas, L. Bauer, N. Christin, L. F. Cranor, and J. Lopez, "Guess again (and again and again): measuring password strength by simulating password-cracking algorithms," Proceedings of the 2012 IEEE Symposium on Security and Privacy, pp 523-537.

Y. Zhang, F. Monrose, and M. K. Reiter, "The security of modern password expiration: an algorithmic framework and empirical analysis," Proceedings of ACM CCS'10, 2010.

M. Weir, S. Aggarwal, M. Collins, and H. Stern, "Testing metrics for password creation policies by attacking large sets of revealed passwords," Proceedings of CCS '10, Oct. 4-8, 2010, pp. 163-175.

S. Houshmand and S. Aggarwal, "Building better passwords using probabilistic techniques," Proceedings of the 28th Annual Computer Security Applications Conference (ACSAC '12), December 2012, pp. 109-118.

Hashcat advanced password recovery.

S. Riley, "Password security: what users know and what they actually do," Usability News, 8(1).

B. Stone-Gross, M. Cova, L. Cavallaro, B. Gilbert, M. Szydlowski, R. Kemmerer, C. Kruegel, and G. Vigna, "Your botnet is my botnet: analysis of a botnet takeover," Proceeding of the 16th ACM Conference on Computer and Communications Security, pp 635-647.

R. Shay, S. Komanduri, P. G. Kelley, P. G. Leon, M. L. Mazurek, L. Bauer, N. Christin, and L. F. Cranor, "Encountering stronger password requirements: user attitudes and behaviors," In 6th Symposium on Usable Privacy and Security, July 2010.

C. Castelluccia, M. Durmuth, D. Perito, "Adaptive password-strength meters from Markov models," NDSS '12.

S. Schechter, C. Herley, M. Mitzenmacher, "Popularity is everything: a new approach to protecting passwords from statistical-guessing attacks," HotSec'10: Proceedings of the 5th USENIX conference on Hot Topics in Security.

De Luca, R. Weiss, and H. Hussmann, "PassShape—stroke based shape passwords," Proceedings of OzCHI 2007.

D. Schweitzer, J. Boleng, C. Hughes, and L. Murphy, "Visualizing keyboard pattern password," 6th International Workshop on Visualization for Cyber Security, 2009, pp 69-73.

J. Bonneau, "The science of guessing: analyzing an anonymized corpus of 70 million passwords," In the 2012 IEEE Symposium on Security and Privacy, 2012, pp. 538-552.

Vance, "If your password is 123456, just make it hackme," New York Times, January 2010.

Bernd Chang, "6 Million User Data of China Software Developer Network (CSDN) Leaked", HUG China, Dec. 22, 2011.

Jeff Yan, Alan Blackwell, Ross Anderson, and Alasdair Grant. "Password Memorability and Security: Empirical Results," IEEE Security and Privacy Magazine, 2(5):25, 2004.

Kuo, C., Romanosky, S., and Cranor, L. F., "Human Selection of Mnemonic Phrase-based Passwords," Symp. on Usable Privacy and Security (SOUPS), 2006.

Joseph Bonneau, and Ekaterina Shutova, "Linguistic properties of multi-word passphrases," FC'12, Proceedings of the 16th international conference on Financial Cryptography and Data Security, 2010, PP. 1-12.

D. V. Klein, "Foiling the cracker: a survey of and improvements to password security," Proceedings of USENIX UNIX Security Workshop, 1990.

R. McMillan, "Phishing attack targets MySpace users", InfoWorld, Oct. 27, 2006.

T. Warren, "Thousands of hotmail passwords leaked", Neowin, 2009.

S. Musil, "Hackers post 450K credentials pilfered from Yahoo", CNET, Jul. 11, 2012.

"The English Open Word List", Dreamsteep.

"Word lists . . . ", Outpost 9, 2005.

Michael Garey and David S. Johnson, "Computers and Intractability: A Guide to the Theory of NP-Completeness," W.H Freeman and Co. 1979.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

Hardware and Software Infrastructure Examples

The present invention may be embodied on various computing platforms that perform actions responsive to software-based instructions and most particularly on touchscreen portable devices. The following provides an antecedent basis for the information technology that may be utilized to enable the invention.

The computer readable medium described in the claims below may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire-line, optical fiber cable, radio frequency, etc., or any suitable combination of the foregoing. Computer program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It should be noted that when referenced, an "end-user" is an operator of the software as opposed to a developer or author who modifies the underlying source code of the software. For security purposes, authentication means identifying the particular user while authorization defines what procedures and functions that user is permitted to execute.

GLOSSARY OF CLAIM TERMS

Alpha string structure: This term is used herein to refer to a pure keyboard component that contains alpha characters only for consideration in assigning probability values.

Alpha string: This term is used herein to refer to any sequence or combination of alphabetic characters. For example, alphabetic characters may include letters A to Z.

A-pattern: This term is used herein to refer to a relevant pattern containing a randomized pattern of characters or any pattern that is not an A-word, R-word, R-pattern, or M-word. An example is the string "ahskdi".

Assign: This term is used herein to refer to a computer's ability to compute and attribute a characteristic to a structure, such as a password string, base structure, simple structure, pre-terminal structure, etc. The characteristic may be the probability value of the structure matching the targeted password.

Authentication: This term is used herein to refer to proof of the identity of a user logging onto a network or other communication channel.

A-word: This term is used herein to refer to a relevant pattern containing a single word, such as the string "password".

Base structure: This term is used herein to refer to a sequence or combination of alpha, digit and/or special substrings that captures the length of the observed substrings.

Brute force attack: This term is used herein to refer to a known strategy of cracking a password by systematically checking all possible keys until the correct key is determined.

Contiguous characters: This term is used herein to refer to keys physically next to a specific or starting key or is the same as the specific or starting key.

Dictionary attack: This term is used herein to refer to a known strategy of cracking a password by successively attempting all words or keys in an exhaustive list (i.e., dictionary).

Digit structure: This term is used herein to refer to a pure keyboard component that contains digits only for consideration in assigning probability values.

Digit: This term is used herein to refer to any sequence or combination of numeric characters. For example, numeric characters may include numbers 0 to 9.

Input dictionary: This term is used herein to refer to an exhaustive list of words or keys that can be entered into computer software, such that these words or keys can be used for transforming pre-terminal structures into password guesses.

Keyboard pattern structure: This term is used herein to refer to a component that contains a keyboard pattern (see definition) for consideration in assigning probability values.

Keyboard pattern: This term is used herein to refer to physical patterns on the keyboard that are remembered because of their shape. It is a sequence of contiguous characters starting from some particular key.

Known password string: This term is used herein to refer to a word or key in an input dictionary that has become known to the public either intentionally or unintentionally.

Lengthy substring: This term is used herein to refer to the longest initial substring that is a word in the training dictionary and thus can be identified as a possible first component in the M-word algorithm.

Login interface: This term is used herein to refer to a connection between a user and a computer, network or program, said connection traversed via a user's identification and the targeted password.

M-word: This term is used herein to refer to a relevant pattern containing multiple non-repetitive words, such as the string "iloveyou".

Password guess string: This term is used herein to refer to a calculated prediction of a targeted password.

Password length: This term is used herein to refer to the number of alpha, numeric and special characters in a password guess or in a targeted password.

Pattern: This term is used herein to refer to any statistical, mathematical or otherwise related arrangement of alpha, numeric and special characters within a plurality of words or keys that may be found in an input dictionary.

Physical sequence shape: This term is used herein to refer to a memorable shape or profile formed by a set of contiguous characters in a keyboard pattern.

Primary dictionary: This term is used herein to refer to a larger attack dictionary principally used to generate password guesses.

Probabilistic password cracking system: This term is used herein to refer to a methodology and model of effectively and efficiently making password guesses of a targeted password through the use of probability values assigned to the password guesses or to structures associated with the password guesses.

Probability smoothing: This term is used herein to refer to the technique of assigning probabilities to values not found in the training set (i.e., the plurality of dictionaries, other keys or words used or known password strings). For example, a variant of Laplacian smoothing may be used to assign probabilities to all digit strings, special strings, alpha strings, and base structures.

Probability value: This term is used herein to refer to the numerical quantity of the relative likelihood of a password guess or other related structure correctly matching the targeted password.

Relevant pattern: This term is used herein to refer to a memorable configuration of characters used in a password string, where the configuration may be a single word, multi-words, repetitive words, or random, etc.

Repetitive alpha string: This term is used herein to refer to a sequence or combination of alphabetic characters that repeats in the M-word algorithm.

R-pattern: This term is used herein to refer to a relevant pattern containing a repeated string of non-words or patterns, such as the string "xyzxyz".

R-word: This term is used herein to refer to a relevant pattern containing one or more repeated words, such as the string "boatboat".

Secondary dictionary: This term is used herein to refer to a smaller attack dictionary used for additional utility (i.e., in addition to the primary dictionary) on the success of the password cracking.

Special character: This term is used herein to refer to any sequence or combination of non-alpha and non-digit symbols. For example, non-alpha and non-digit symbols may include !@#$%^&*( )- . . . =+[ ]{ };':",./< >?.

Special symbol structure: This term is used herein to refer to a pure keyboard component that contains special symbols only for consideration in assigning probability values.

Substructure: This term is used herein to refer to a particular component or substring of a base structure, such as, for example, the alpha component, the digit component, and/or the special character component.

Targeted group: This term is used herein to refer to a population of people or number of targeted passwords that have relation to each other or form a pattern. For example, a "targeted group" based on language may derive word-mangling rules of suffixes based on that language, or a "targeted group" based on password creation policies may derive word-mangling rules that contain at least one numeric character, at least one special character, and at least one uppercase alpha character.

Targeted password: This term is used herein to refer to a sequence or combination of alpha, numeric and/or special characters that is subject to password guesses made by an operator of the novel probabilistic password cracking system.

Word-mangling rules: This term is used herein to refer to a set of regulations or guidelines for a password cracking system to utilize when making password guesses off of a key or word found in an input dictionary. "Word-mangling rules" can be manually preset or can be automatically generated based on patterns in the input dictionaries or in the targeted group. Examples of word-mangling rules include, but are not limited to, adding numbers to the end of words, reversing words, duplicating words, uppercasing words, inserting other characters within words, among an endless multitude of possible rules.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. One or more tangible non-transitory computer-readable media having computer-executable instructions for performing a method of running a software program on a computing device, the computing device operating under an operating system, the method including issuing instructions from the software program for a computer processor to generate a probabilistic password cracking system for cracking a targeted password for a secured user account associated with a user, the instructions comprising:

receiving a plurality of known password strings, said plurality of known password strings formed of at least one category selected from the group consisting of alpha strings, digits, and special characters;

deriving one or more base structures from said plurality of known password strings, whereby one base structure may include more than one password string from said plurality of known password strings;

automatically incorporating a keyboard pattern into said one or more base structures, said keyboard pattern contained within at least one password string of said plurality of known password strings, said keyboard pattern being a sequence of contiguous characters starting from a particular key without regards to actual characters typed but uses a physical sequence shape of the actual characters;

automatically assigning a set of probability values to each base structure of said one or more base structures based on a probability value of each alpha string, each digit, each special character, or each keyboard pattern in said each base structure;

creating a probabilistic context free grammar based on said set of probability values assigned to said each base structure;

receiving one or more input dictionaries containing a plurality of sequences of alpha characters;

generating password guess strings in decreasing estimated probability via said probabilistic context-free grammar by utilizing said plurality of sequences of alpha characters;

accessing a login interface to the secured user account; and applying said password guess strings from said computer processor sequentially to said login interface, whereby authentication of the user can be achieved.

2. One or more tangible non-transitory computer-readable media as in claim 1, wherein when a known password string of said plurality of known password strings includes only contiguous digits or only contiguous special symbols, said known password string is classified as a digit structure or a special symbol structure and not as a keyboard pattern structure.

3. One or more tangible non-transitory computer-readable media as in claim 1, wherein when a known password string of said plurality of known password strings includes only contiguous alpha characters, said known password string is classified as an alpha string structure and not as a keyboard pattern structure.

4. One or more tangible non-transitory computer-readable media as in claim 1, further comprising:

detecting patterns in said plurality of known password strings; and automatically deriving word-mangling rules based on said detected patterns.

5. One or more tangible non-transitory computer-readable media as in claim 4, further comprising:

said word-mangling rules derived further based on said targeted password having an association with a targeted group, said targeted group based on at least one criterion selected from the group consisting of language, age, affiliation, and password creation policies.

6. One or more tangible non-transitory computer-readable media as in claim 1, further comprising:

utilizing probability smoothing to assign additional probability values to other keyboard patterns for other password strings not found in said plurality of password strings.

7. One or more tangible non-transitory computer-readable media as in claim 6, wherein said step of utilizing probability smoothing is achieved by an equation $$Prob(p) = Prob(s) \frac{N_i + \alpha}{\sum N_i + C\alpha}$$

where Prob(s) is the probability of a keyboard shape s given the length of the keyboard pattern, Ni is the number of times an ith keyboard pattern of a shape s was found, $\alpha$ is a smoothing value, $\Sigma N_i$ is a sum of counts of the keyboard patterns found for the shape s, and C is a total number of unique patterns for the shape s.

8. One or more tangible non-transitory computer-readable media as in claim 1, further comprising:

detecting relevant patterns from said plurality of known password strings, wherein said relevant patterns include an A-word, an R-word, an R-pattern, an M-word, and an A-pattern; and incorporating said relevant patterns into said probabilistic context-free grammar.

9. One or more tangible non-transitory computer-readable media as in claim 1, further comprising:

optimizing a primary dictionary of said one or more input dictionaries based on size and content of said primary dictionary; and assigning an additional probability value to said primary dictionary, wherein an effectiveness of said primary dictionary is measured by coverage and precision of said primary dictionary cracking said targeted password.

10. One or more tangible non-transitory computer-readable media as in claim 9, further comprising:

said one or more input dictionaries further including a secondary dictionary for cracking said targeted password.

11. One or more tangible non-transitory computer-readable media having computer-executable instructions for performing a method of running a software program on a computing device, the computing device operating under an operating system, the method including issuing instructions from the software program for a computer processor to generate a probabilistic password cracking system for cracking a targeted password for a secured user account associated with a user, the instructions comprising:

receiving a plurality of known password strings, said plurality of known password strings formed of at least one category selected from the group consisting of alpha strings, digits, and special characters;

deriving one or more base structures from said plurality of known password strings, whereby one base structure may include more than one password string from said plurality of known password strings;

detecting relevant patterns from said plurality of known password strings, wherein said relevant patterns include an A-word, an R-word, an R-pattern, an M-word, and an A-pattern;

automatically assigning a set of probability values to each relevant pattern of said relevant patterns and to each base structure of said one or more base structures based on a probability value of each alpha string, each digit, or each special character in said each base structure;

creating a probabilistic context free grammar based on said set of probability values assigned to said each relevant pattern to said each base structure;

receiving one or more input dictionaries containing a plurality of sequences of alpha characters;

generating password guess strings in decreasing estimated probability via said probabilistic context-free grammar by utilizing said plurality of sequences of alpha characters;

accessing a login interface to the secured user account; and applying said password guess strings from said computer processor sequentially to said login interface, whereby authentication of the user can be achieved.

12. One or more tangible non-transitory computer-readable media as in claim 11, further comprising:

automatically incorporating a keyboard pattern into said one or more base structures, said keyboard pattern contained within at least one password string of said plurality of known password strings, said keyboard pattern being a sequence of contiguous characters starting from a particular key without regards to actual characters typed but uses a physical sequence shape of the actual characters, said step of automatically assigning said set of probability values to said each base structure of said one or more base structures further based on each keyboard pattern in said each base structure.

13. One or more tangible non-transitory computer-readable media as in claim 12, further comprising:
utilizing probability smoothing to assign additional probability values to other keyboard patterns for other password strings not found in said plurality of password strings.

14. One or more tangible non-transitory computer-readable media as in claim 12, wherein when a known password string of said plurality of known password strings includes only contiguous alpha characters, only contiguous digits, or only contiguous special symbols, said known password string is classified as an alpha string structure, a digit structure, or a special symbol structure and not as a keyboard pattern structure.

15. One or more tangible non-transitory computer-readable media as in claim 11, further comprising:
said step of creating said probabilistic context free grammar further including deriving substructures from said alpha strings.

16. One or more tangible non-transitory computer-readable media as in claim 11, further comprising:
classifying a relevant pattern as said A-word by checking the presence of said each alpha string in said plurality of known password strings;
classifying a relevant pattern as said R-word or said R-pattern by checking a repetition of said each alpha string in said plurality of known password strings, followed by checking the presence of the pattern of said each alpha string in said plurality of known password strings;
classifying a relevant pattern as said M-word only if said relevant pattern is not classified as said A-word, said R-word, or said R-pattern; and
classifying a relevant pattern as said A-pattern if said relevant pattern is not classified as said M-word.

17. One or more tangible non-transitory computer-readable media as in claim 16, further comprising:
said step of classifying a relevant pattern as said M-word performed by detecting a lengthy substring that is a word in said plurality of known password strings; and
identifying said lengthy substring as a first component within said relevant pattern by starting at a rightmost character of said targeted password and recursively calling said M-word classification on the remaining substring of said lengthy substring.

18. One or more tangible non-transitory computer-readable media as in claim 11, further comprising:
optimizing a primary dictionary of said one or more input dictionaries based on size and content of said primary dictionary; and
assigning an additional probability value to said primary dictionary,
wherein an effectiveness of said primary dictionary is measured by coverage and precision of said primary dictionary cracking said targeted password.

19. One or more tangible non-transitory computer-readable media as in claim 18, further comprising:
said one or more input dictionaries further including a secondary dictionary for cracking said targeted password.

20. One or more tangible non-transitory computer-readable media having computer-executable instructions for performing a method of running a software program on a computing device, the computing device operating under an operating system, the method including issuing instructions from the software program for a computer processor to generate a probabilistic password cracking system for cracking a targeted password for a secured user account associated with a user, the instructions comprising:
receiving a plurality of known password strings, said plurality of known password strings formed of at least one category selected from the group consisting of alpha strings, digits, and special characters;
deriving one or more base structures from said plurality of known password strings, whereby one base structure may include more than one password string from said plurality of known password strings;
automatically incorporating a keyboard pattern into said one or more base structures, said keyboard pattern contained within at least one password string of said plurality of known password strings, said keyboard pattern being a sequence of contiguous characters starting from a particular key without regards to actual characters typed but uses a physical sequence shape of the actual characters;
automatically assigning a set of probability values to each base structure of said one or more base structures based on a probability value of each alpha string, each digit, each special character, or each keyboard pattern in said each base structure;
creating a probabilistic context free grammar based on said set of probability values assigned to said each base structure, wherein when a known password string of said plurality of known password strings includes only contiguous alpha characters, only contiguous digits, or only contiguous special symbols, said known password string is classified as an alpha string structure, a digit structure, or a special symbol structure and not as a keyboard pattern structure,
said step of creating said probabilistic context free grammar further including deriving substructures from said alpha strings;
detecting relevant patterns from said plurality of known password strings, wherein said relevant patterns include an A-word, an R-word, an R-pattern, an M-word, and an A-pattern;
classifying a relevant pattern as said A-word by checking the presence of said each alpha string in said plurality of known password strings;
classifying a relevant pattern as said R-word or said R-pattern by checking a repetition of said each alpha string in said plurality of known password strings, followed by checking the presence of the pattern of said each alpha string in said plurality of known password strings;
classifying a relevant pattern as said M-word only if said relevant pattern is not classified as said A-word, said R-word, or said R-pattern, said step of classifying a relevant pattern as said M-word performed by detecting a lengthy substring that is a word in said plurality of known password strings and identifying said lengthy substring as a first component within said relevant pattern by starting at a rightmost character of said targeted password and recursively calling said M-word classification on the remaining substring of said lengthy substring;
classifying a relevant pattern as said A-pattern if said relevant pattern is not classified as said M-word;
automatically deriving word-mangling rules based on said detected relevant patterns, said word-mangling rules derived further based on said targeted password having an association with a targeted group, said targeted group based on at least one criterion selected from the group consisting of language, age, affiliation, and password creation policies;

incorporating said relevant patterns into said probabilistic context-free grammar;

utilizing probability smoothing to assign additional probability values to other keyboard patterns for other password strings not found in said plurality of password strings, wherein said step of utilizing probability smoothing is achieved by an equation $$Prob(p) = Prob(s)\frac{N_i + \alpha}{\sum N_i + C\alpha}$$

where Prob(s) is the probability of a keyboard shape s given the length of the keyboard pattern, Ni is the number of times an ith keyboard pattern of a shape s was found, $\alpha$ is a smoothing value, $\Sigma N_i$ is a sum of counts of the keyboard patterns found for the shape s, and C is a total number of unique patterns for the shape s;

receiving one or more input dictionaries containing a plurality of sequences of alpha characters;

optimizing a primary dictionary of said one or more input dictionaries based on size and content of said primary dictionary;

assigning an additional probability value to said primary dictionary, wherein an effectiveness of said primary dictionary is measured by coverage and precision of said primary dictionary cracking said targeted password, said one or more input dictionaries further including a secondary dictionary for cracking said targeted password;

generating password guess strings in decreasing estimated probability via said probabilistic context-free grammar by utilizing said plurality of sequences of alpha characters;

accessing a login interface to the secured user account; and applying said password guess strings from said computer processor sequentially to said login interface, whereby authentication of the user can be achieved.

* * * * *